(12) United States Patent
Honkote et al.

(10) Patent No.: US 12,202,148 B2
(45) Date of Patent: Jan. 21, 2025

(54) AUTONOMOUS MACHINE COLLABORATION

(71) Applicant: Intel Corporation, Santa Clara, CA (US)

(72) Inventors: Vinayak Honkote, Bangalore (IN); John Charles Weast, Portland, OR (US); Rajesh Poornachandran, Portland, OR (US); Dibyendu Ghosh, Bangalore (IN); Karthik Narayanan, Bangalore (IN); Ganeshram Nandakumar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 883 days.

(21) Appl. No.: 17/130,020

(22) Filed: Dec. 22, 2020

(65) Prior Publication Data

US 2021/0107152 A1    Apr. 15, 2021

(51) Int. Cl.
*B25J 9/16* (2006.01)

(52) U.S. Cl.
CPC ................... *B25J 9/1674* (2013.01)

(58) Field of Classification Search
CPC ...... B25J 9/1674; B25J 9/1661; B25J 9/1694; G05B 19/4184; G05B 2219/31336;
(Continued)

(56) References Cited

U.S. PATENT DOCUMENTS

| 4,553,213 A | * | 11/1985 | Hyatt ................. G11C 27/04 332/185 |
| 4,663,721 A | * | 5/1987 | Herscovici ......... G05B 19/4163 408/11 |

(Continued)

FOREIGN PATENT DOCUMENTS

| CN | 107852535 A | * | 3/2018 | ............. G06F 13/00 |
| CN | 105474166 B | * | 8/2018 | ........... G06F 16/245 |

(Continued)

OTHER PUBLICATIONS

"Contextual Awareness in Human-Advanced-Vehicle Systems: a Survey;" Fernandez-Rojas et al., IEEE Access (vol. 7, pp. 33304-33328); Apr. 12, 2019 (Year: 2019).*

(Continued)

*Primary Examiner* — Khoi H Tran
*Assistant Examiner* — Jorge O Peche
(74) *Attorney, Agent, or Firm* — Viering, Jentschura & Partner mbB

(57) ABSTRACT

A controller including a processor configured to obtain a message from a task performing agent of a group of task performing agents allocated to a plurality of tasks, wherein the message comprises information about one or more assessments of the task performing agent, wherein the one or more assessments are based on a sensing process performed by one or more sensors of the task performing agent, wherein the task performing agent is an autonomous machine or a human agent equipped with sensors; and allocate a task of the plurality of tasks to the task performing agent, based on the information and based on whether the task performing agent is an autonomous machine or a human agent.

8 Claims, 13 Drawing Sheets

(58) Field of Classification Search
CPC ...... G05B 2219/37581; G05B 19/4183; G05B 19/41865; G05B 2219/32009; Y02P 90/02
See application file for complete search history.

(56) References Cited

U.S. PATENT DOCUMENTS

| | | | | |
|---|---|---|---|---|
| 4,686,655 | A * | 8/1987 | Hyatt | G02F 1/13318 708/3 |
| 5,838,882 | A * | 11/1998 | Gan | B25J 9/1694 901/30 |
| 6,268,853 | B1 * | 7/2001 | Hoskins | G05B 23/0272 715/965 |
| 8,930,023 | B2 * | 1/2015 | Gutmann | G05D 1/028 901/1 |
| 10,611,026 | B1 * | 4/2020 | Sun | G06N 7/01 |
| 10,874,464 | B2 * | 12/2020 | Roh | G16H 50/20 |
| 11,334,069 | B1 * | 5/2022 | Buerger | H04L 41/046 |
| 11,351,680 | B1 * | 6/2022 | Rosenberg | B25J 19/0095 |
| 12,046,148 | B2 * | 7/2024 | Hashimoto | B25J 9/1605 |
| 2006/0112034 | A1 * | 5/2006 | Okamoto | G05D 1/0274 706/16 |
| 2008/0004505 | A1 * | 1/2008 | Kapit | G16H 10/60 600/300 |
| 2012/0259464 | A1 * | 10/2012 | Morioka | B25J 9/1674 700/254 |
| 2013/0158709 | A1 * | 6/2013 | Shi | B25J 9/0084 901/47 |
| 2015/0201004 | A1 * | 7/2015 | Moon | G06F 9/45558 709/203 |
| 2016/0059419 | A1 * | 3/2016 | Suzuki | B25J 9/1692 901/14 |
| 2017/0182663 | A1 * | 6/2017 | Feldmann | B25J 9/1676 |
| 2017/0358201 | A1 * | 12/2017 | Govers | G05D 1/0248 |
| 2018/0056520 | A1 * | 3/2018 | Ozaki | B25J 13/084 |
| 2018/0165978 | A1 * | 6/2018 | Wood | G06T 19/006 |
| 2018/0275679 | A1 * | 9/2018 | Baughman | B25J 9/1661 |
| 2019/0047149 | A1 * | 2/2019 | Wouhaybi | B25J 9/1666 |
| 2019/0049975 | A1 * | 2/2019 | Kattepur | G05D 1/0217 |
| 2019/0122036 | A1 * | 4/2019 | Ward | G06Q 10/06393 |
| 2019/0197497 | A1 * | 6/2019 | Abari | G05D 1/0088 |
| 2019/0248007 | A1 * | 8/2019 | Duffy | B25J 15/0066 |
| 2019/0322467 | A1 * | 10/2019 | Ooba | B25J 9/1697 |
| 2019/0324444 | A1 * | 10/2019 | Cella | G06N 3/088 |
| 2019/0339688 | A1 * | 11/2019 | Cella | H04L 1/18 |
| 2020/0023519 | A1 * | 1/2020 | Kurze | B25J 13/085 |
| 2020/0094411 | A1 * | 3/2020 | Tan | B25J 9/1661 |
| 2020/0133257 | A1 * | 4/2020 | Cella | G05B 19/4183 |
| 2020/0225655 | A1 * | 7/2020 | Cella | G05B 19/41875 |
| 2020/0250490 | A1 * | 8/2020 | Ozawa | G06V 40/174 |
| 2020/0306988 | A1 * | 10/2020 | Shaffer | G05B 19/4184 |
| 2020/0348662 | A1 * | 11/2020 | Cella | G05B 19/41865 |
| 2021/0069910 | A1 * | 3/2021 | Oleynik | F25D 23/028 |
| 2021/0107151 | A1 * | 4/2021 | Wouhaybi | B25J 9/1661 |
| 2021/0107153 | A1 * | 4/2021 | Poornachandran | G05B 19/042 |
| 2021/0109493 | A1 * | 4/2021 | Poornachandran | G05B 19/0423 |
| 2021/0133633 | A1 * | 5/2021 | Poornachandran | G06N 20/00 |
| 2021/0140793 | A1 * | 5/2021 | Tickoo | G01C 21/3863 |
| 2021/0146546 | A1 * | 5/2021 | Linkowski | B25J 9/1676 |
| 2021/0157312 | A1 * | 5/2021 | Cella | G01M 13/045 |
| 2021/0187737 | A1 * | 6/2021 | Fujimoto | B25J 9/1661 |
| 2021/0232149 | A1 * | 7/2021 | Griffin | G06V 20/10 |
| 2021/0232989 | A1 * | 7/2021 | Rana | G05B 19/418 |
| 2021/0233654 | A1 * | 7/2021 | Arthur | G06Q 10/063114 |
| 2021/0248399 | A1 * | 8/2021 | Martin | G06F 3/013 |
| 2021/0270858 | A1 * | 9/2021 | Imai | G01N 1/10 |
| 2021/0309264 | A1 * | 10/2021 | Felip Leon | B25J 9/1666 |
| 2021/0387350 | A1 * | 12/2021 | Oleynik | A47J 44/00 |
| 2022/0004162 | A1 * | 1/2022 | Kriveshko | F16P 3/147 |
| 2022/0009103 | A1 * | 1/2022 | Buerkle | B25J 9/1666 |
| 2022/0063100 | A1 * | 3/2022 | Moriguchi | B25J 9/1661 |
| 2022/0105634 | A1 * | 4/2022 | Oboril | G09B 19/24 |
| 2022/0105635 | A1 * | 4/2022 | Chin | B25J 9/1676 |
| 2022/0108262 | A1 * | 4/2022 | Cella | G05B 17/02 |
| 2022/0171385 | A1 * | 6/2022 | Cui | H04W 4/46 |
| 2022/0288777 | A1 * | 9/2022 | Harms | B25J 9/1661 |
| 2022/0288781 | A1 * | 9/2022 | Schoessler | B25J 9/1651 |
| 2022/0334582 | A1 * | 10/2022 | Bryner | B62D 57/024 |
| 2022/0414566 | A1 * | 12/2022 | Napoli | G06Q 10/06311 |
| 2023/0066945 | A1 * | 3/2023 | Heo | B25J 9/1661 |
| 2023/0096477 | A1 * | 3/2023 | Kanto | B23Q 17/20 700/186 |
| 2023/0173677 | A1 * | 6/2023 | Finke | B25J 19/0095 700/254 |
| 2023/0176581 | A1 * | 6/2023 | Miyajima | G06Q 10/20 701/23 |
| 2023/0196230 | A1 * | 6/2023 | Cella | G06V 10/82 705/7.17 |
| 2023/0202050 | A1 * | 6/2023 | Saijo | B25J 9/0003 700/245 |
| 2023/0256606 | A1 * | 8/2023 | Wang | B25J 19/027 700/255 |
| 2023/0311313 | A1 * | 10/2023 | Shao | B25J 9/163 |
| 2023/0364787 | A1 * | 11/2023 | Cygan | B25J 9/163 |

FOREIGN PATENT DOCUMENTS

| | | | | |
|---|---|---|---|---|
| CN | 111563446 | B * | 9/2021 | G01C 11/00 |
| CN | 114254022 | A * | 3/2022 | |
| CN | 114928461 | A * | 8/2022 | |
| CN | 117742261 | A * | 3/2024 | |
| EP | 3579174 | A1 * | 12/2019 | G05B 19/41895 |
| JP | 6517762 | B2 * | 5/2019 | B25J 11/0005 |
| KR | 20230135069 | A * | 9/2023 | |
| KR | 20240003844 | A * | 1/2024 | |
| WO | WO-2009040777 | A2 * | 4/2009 | G06N 3/008 |
| WO | WO-2021156647 | A1 * | 8/2021 | A47J 36/321 |
| WO | WO-2022012366 | A1 * | 1/2022 | G06Q 10/06311 |

OTHER PUBLICATIONS

"Agent as Cerebrum, Controller as Cerebellum: Implementing an Embodied LM M-based Agent on Drones;" Zhao et al., Arxiv ID: 2311.15033 ; Nov. 25, 2023. (Year: 2023).*

"Task-Oriented Communication Design in Cyber-Physical Systems: a Survey on Theory and Applications;" Mostaani et al.; IEEE Access (vol. 10, pp. 133842-133868); Jan. 1, 2022. (Year: 2022).*

"on a shared human-robot task scheduling and on-line re-scheduling;" Nikolakis et al.; Procedia CIRP; vol. 78, 2018, pp. 237-242. (Year: 2018).*

Nikolakis, Nikolaos et al., "On a shared human-robot task scheduling and online re-scheduling", Science Direct, Procedia CIRP, 2018, pp. 237-242, Elsevier, vol. 78.

European Search Report issued for the corresponding European patent application No. 21195752, dated Jul. 4, 2022, 2 pages (for informational purposes only).

* cited by examiner

AUTONOMOUS MACHINE COLLABORATION

TECHNICAL FIELD

Various aspects of this disclosure generally relate to methods and systems of collaboration among autonomous machines and controllers and code segments thereof.

BACKGROUND

Autonomous machines may replace or assist humans for various tasks and other services. Industry 4.0 brings digital and physical technologies together to create responsive, interconnected operations. Solutions designed for the Industrial Internet of Things (IIoT) use connected sensors and edge devices to help improve product quality and factory operational efficiency in real time. Autonomous machines may be incorporated in industrial environments, manufacturing, and delivery environments to make informed and timely decisions.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary embodiments of the disclosure are described with reference to the following drawings.

DESCRIPTION

Figure 1:
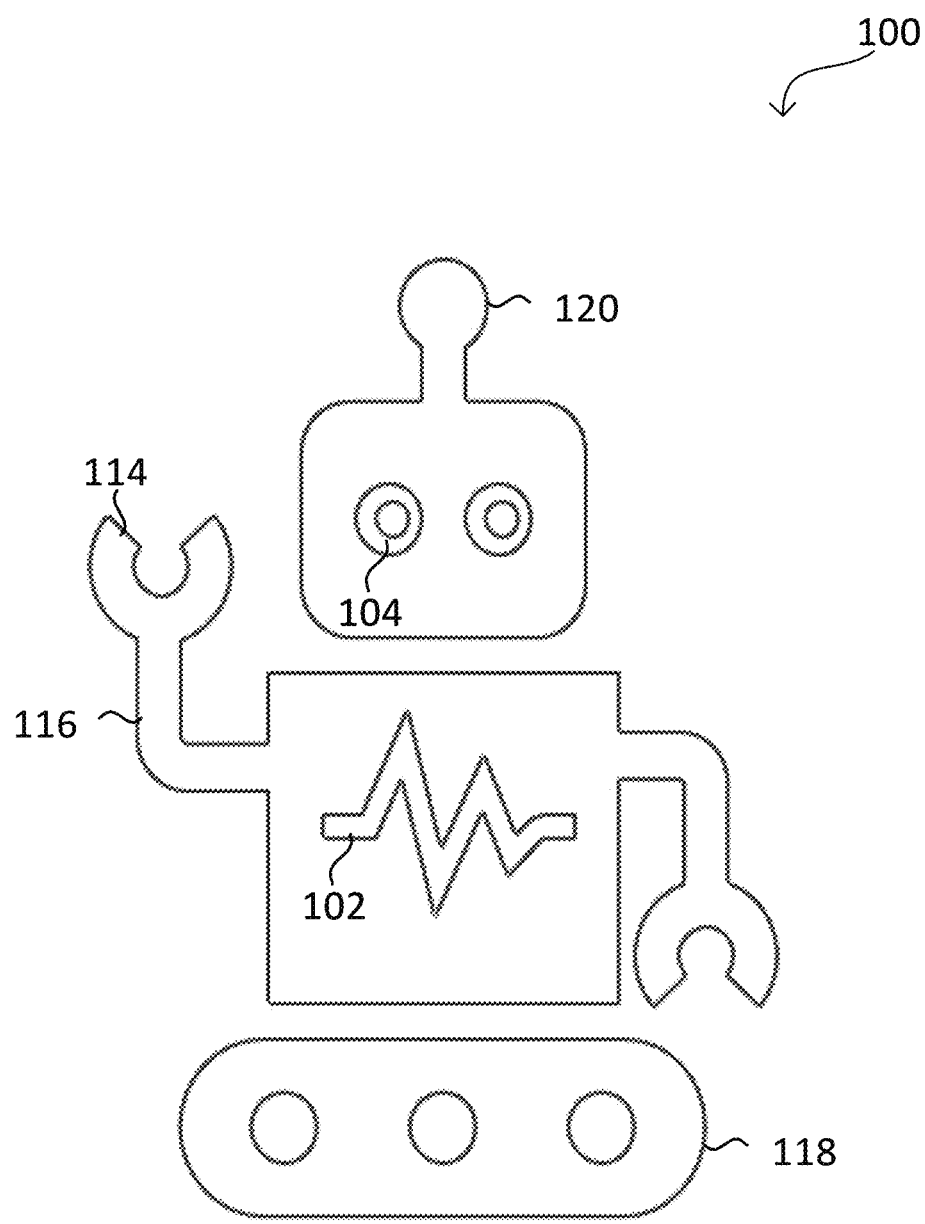
FIG. 1 shows an exemplary autonomous machine in accordance with various aspects of the present disclosure.

The following detailed description refers to the accompanying drawings that show, by way of illustration, exemplary details and aspects in which the present disclosure may be practiced.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as used herein may be understood as any kind of technological entity that allows handling of data. The data may be handled according to one or more specific functions that the processor or controller may execute. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" as used herein may be understood as a computer-readable medium (e.g., a non-transitory computer-readable medium), in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where radio-layer components carry out the physical transmission and reception, such as radio frequency (RF) transceivers and antennas, and the processors or controllers perform the logical transmission and reception over the software-level connection. The term "communicate" encompasses one or both of transmitting and receiving, i.e., unidirectional or bidirectional communication in one or both of the incoming and outgoing directions. In general, the term "communicate" may include the exchange of data, e.g., unidirectional or bidirectional exchange in one or both of the incoming and outgoing directions. The term "calculate" encompasses both 'direct' calculations via a mathematical expression/formula/relationship and 'indirect' calculations via lookup or hash tables and other array indexing or searching operations.

A "machine" may be understood to include any type of mechanical structure that uses (e.g., electrical) power to alter its environment, to apply forces, to control movement and/or to perform an intended action, e.g., a mechanical structure programmable by a computer. By way of example, a machine may be a driven object with a combustion engine, a reaction engine, an electrically driven object, a hybrid driven object, or a combination thereof. A machine may be or may include a humanoid machine, a non-humanoid machine, an agricultural machine, a machine tool, a moving machine, a stationary machine, a drone, an industrial machine, a medical operating machine, a collectively operating machine, a ground machine, an aerial machine, an aquatic machine, or a mixture thereof, among others.

A "ground machine" may be understood to include any type of machine, as described above, which is configured to traverse the solid ground, e.g., within a building, as part of a production line, on a street, on a road, on a track, off-road, etc. An aerial machine may be understood to include any type of machine, as described above, which is configured lift itself, e.g., to fly or hover.

An "aquatic machine" may be understood to include any type of machine, which is configured to travel on, just above the surface or below the waterline. It may float, be a submersible or travel upon the surface of the water as in a hydrofoil.

The term "automated machine" as used herein (also referred to as a at least partially autonomous machine or as robot) may describe a machine capable of managing one or more tasks (also referred to as task performance) at least partially without human intervention, input, and/or control. Examples of the automated machine may include a hybrid machine, a human assisted machine and/or an autonomous machine. The term "autonomous machine" as used herein (also referred to as autonomous robot) may describe a (e.g., automated) machine capable of managing one or more tasks (also referred to as task performance) without human intervention, input, and/or control. Exemplary components of managing task may include: managing one or more physical tasks (also referred to as task management), planning the task performance, organizing the task performance, scheduling the task performance, switching between two tasks, competing for one or more task, assigning one or more tasks, completing one or more tasks, reporting about completion of the one or more tasks, negotiation of the allocation of one or more tasks (e.g., between multiple autonomous machines), monitoring the progress of one or more tasks, navigate the autonomous machine to one or more positions of one or more tasks (e.g., at which the one or more task require a physical manipulation), etc. References made herein to robots or automated machines may be understood as exemplarily and may analogously apply to any type of autonomous machine, and vice versa. References made herein with regard to one or more autonomous machines may analogously apply to one or more automated machines. According to various aspects, the task management may be collaborative, e.g., when multiple robots are allocated to one or more tasks. The robots implementing the collaborative task management may be configured to exchange data related to the task management.

The task performance may include processing one or more workpieces, e.g., by adding material to the workpiece, removing material from the workpiece, transforming the workpiece and the like. The autonomous machine may implement one or more task performance models, e.g., a respective controller of the autonomous machine may implement the one or more task performance models. A task performance model may be configured to control the task performance by the autonomous machine based on input data, e.g., to convert the input data into control instructions. The controller may be configured to transmit the control instructions within the autonomous machine, e.g., in accordance with an in-machine communication protocol (e.g., a fieldbus communication protocol) and/or to one or more actuators of the autonomous machine. Generally, a task performance model may be (e.g., at least in part) rule based and/or may be (e.g., at least in part) based on machine learning.

Examples of the input data may include: data that one or more of the sensors of the autonomous machine sensed, data that the autonomous machine stores (e.g., in a database), data indicating instructions provided to the autonomous machine (e.g., data that an operator or a group leader receives), data about an affiliation of the autonomous machine to a group (also referred to as group affiliation), data about an assignment of the autonomous machine to one or more tasks of the group, data exchanged between multiple autonomous machines (e.g., data transmitted from another autonomous machine of the group), and/or data about a mission (also referred to as mission data). The control instructions may be understood as in-machine instructions to control one or more actuators of the autonomous machine. Examples of the one or more actuators of the autonomous machine may include: one or more actuators configured to cause a motion of the autonomous machine, one or more actuators configured to actuate a tool of the autonomous machine, one or more actuators configured to move the tool (also referred to as effector) of the autonomous machine (e.g., relative to the one or more actuators configured to cause a motion of the autonomous machine), one or more actuators being part of the kinetic chain (e.g., a robotic arm) of the autonomous machine.

For example, the task performance may be based on sensed data (also referred to as sensing result, sensor data, or as sensing data), e.g., measurements by one or more sensors of the autonomous machine or measurements by one or more sensors external to the autonomous machine (e.g., one or more sensors of another autonomous machine). For example, the task performance may be based on information about the environment of the autonomous machine, e.g., information that the one or more sensors of the autonomous machine sensed or information that one or more external sensors sensed. Alternatively, the task performance may be based on a progress of performing one or more tasks that the autonomous machine performs. For example, one or more sensors of the autonomous machine or the one or more external sensors may be configured to sense the progress of performing the one or more tasks that the autonomous machine performs. For example, task performance may include navigating the machine according to one or more positions, at which the machine performs one or more tasks.

Performing one or more tasks may include one or more actions of the autonomous machine, e.g., one or more spatially distributed actions (e.g., a spatial sequence of actions) and/or one or more spatially chronological actions (e.g., in a chronologic sequence of operations). The spatial distribution of multiple actions (also referred to as machine actions) may indicate, where (i.e., with which spatial relation) and/or in which direction the autonomous machine provides the one or more actions, i.e. in which corresponding spatial position (i.e. position and/or orientation) the autonomous machine or its tool is located.

The one or more tasks may be represented (e.g., logically) by data (also referred to as mission data). A mission may refer to one task or a group of multiple tasks, which are related to each other, e.g., contextually or logically related to each other (for example, tasks directed to the fabrication of a certain product, tasks directed to the exploration of a certain are, and the like). The mission data may be a formal representation of the mission. Examples of the mission data may include: data identifying each task (also referred to as task identifier), data organizing each task (e.g., spatial and/or chronological data), data indicating the criteria under which a task is fulfilled, data indicating goals of each task, data identifying criteria for triggering, terminating, or maintaining a task, etc. Furthermore, the mission data may include a mission logic, which logically links tasks, priorities, criteria, conditions and/or tasks and/or which implements a sequence (e.g., a flow chart), according to which the mission is executed. For example, the mission logic may organize the mission hierarchically, e.g., into hierarchical levels, hierarchical groups, subtasks, and the like. For example, a task may include multiple subtasks on a lower hierarchical level, which may be, but not need to be, prioritized, contextual based and/or conditional. Viewed from the hierarchical level of the subtask, the subtask may also be referred to as task, and may include, but not need to include, multiple subtasks. For example, the mission logic may organize the mission in accordance with conditional aspects and/or contextual aspects. For example, the mission logic may define conditional tasks, e.g., by defining conditions/requirements to be fulfilled for starting a task performance and/or for ending a task performance.

Herein the term "collaborate", "collaborative", "collaboration" refers to entities, such as devices (a plurality of autonomous machines), methods and functions, as examples, participating to accomplish a mission. Examples of the collaborative entities may include various types of agents or actors, such as automated machines (e.g., partially of fully autonomous machines), humans, non-automated machines, or non-autonomous machines. Multiple entities (e.g., autonomous machines) participating in the mission may be affiliated (e.g., assigned) to a group (herein also referred to as group, swarm or as team), e.g., being members (also referred to as agents or as nodes) of the group. Multiple autonomous machines participating in the mission may be affiliated (e.g., assigned) to a group of autonomous machines (herein also referred to as group, swarm or as team), e.g., being members (also referred to as agents or as nodes) of the group of autonomous machines. Each group (e.g., of autonomous machines) may be entrusted with one or more missions. References made herein with respect to a group of autonomous machines may analogously apply to a group of entities, e.g., including various types of agents or actors, such as automated machines (e.g., partially of fully autonomous machines), humans, non-automated machines, or non-autonomous machines. The autonomous machine may be configured to collaborate with one or more other autonomous machine, e.g., by implementing one or more protocols (also referred to as collaboration protocols). Examples of collaboration protocols may include: a protocol for group management (also referred to as group management protocol), a protocol for communication (e.g., data exchange) between members of a group of collaborating autonomous machines (also referred to as group communication protocol), a protocol for managing tasks of the mission (also referred to as task management protocol). Generally, a protocol may define rules that indicate the format, syntax, semantics and/or synchronization of information, e.g., of information transfer (e.g., exchange), information storage, information processing, and the like. For example, the autonomous machine may form, join and/or leave a group in accordance with the group management protocol. For example, the autonomous machine may be configured to communicate with other members of the group in accordance with the group communication protocol. For example, the autonomous machine may be configured to exchange sensed data or exchange model data with other members of the group in accordance with the group communication protocol (also referred to as data exchange protocol). For example, a group identifier used to route a message generated in accordance with the group communication protocol to the group. The automated machine may be configured to broadcast the message to all members of the group, and/or a member identifier or topical filter may route the message to individual members of the group. For example, the autonomous machine may be configured to manage the task performance in accordance with the task management protocol, e.g., synchronizing mission data and/or the status (e.g., the progress and/or accomplishment) of one or more tasks of the mission.

The term "target information" may indicate the respective information of interest about the environmental property. The target information may include various types of information about the environment of the sensor, which are based on the sensing process that the sensor performs, e.g., a result thereof. According to various aspects, the target information may include information about one or more logic, geometric, kinematic, mechanical, radiometric (e.g., photometric), thermodynamically, electrical and/or chemical properties of the environment of the sensor, which are based on the sensing process that the sensor performs, e.g., on a result thereof. This is reflected by the type of the target information, which may be a logical type, geometrical type, kinematical type, mechanical type, radiometrical type (e.g., photometric type), thermodynamical type, electrical type and/or chemical type.

The term "result" with regard to a sensing process (also referred to as sensing result or as result of the sensing process) may refer to an interim stage of data that the sensing chain processes and/or to the target information as output of the processing chain. Examples of the sensing result may include: sensor raw data, an aggregation of raw data, pre-processed (e.g., filtered and/or converted) raw data, a quantized result of processing the sensor raw data, e.g., including numerical information about the sensed property (e.g., one or more values of the sensed property), a classified result of processing the sensor raw data, an estimation made based on the raw data (e.g., output of a model), etc. Examples of the result of an image acquisition as sensing process, may include pixel raw data, the image data based on the raw data, a video, the result of an object recognition based on the image data, a spectral composition, a light intensity value, a distance determined based on the image data, etc.

Various aspects herein may utilize one or more machine learning models to perform or control functions of the machine (or other functions described herein). The term "model" used herein may be understood as any kind of algorithm, which provides output data based on input data provided to the model (e.g., any kind of algorithm generating or calculating output data based on input data). A computing system may execute a machine learning model to progressively improve performance of a specific task. In some aspects, parameters of a machine learning model may be adjusted during a training phase based on training data. A trained machine learning model may be used during an inference phase to make estimations or decisions based on input data. In some aspects, the trained machine learning model may be used to generate additional training data. An additional machine learning model may be adjusted during a second training phase based on the generated additional training data. A trained additional machine learning model may be used during an inference phase to make estimations or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to estimate the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive feedback (also referred to as reward) or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, the outputs may be restricted to a limited set of values (e.g., one or more classes). The classification model may output a class for an input set of one or more input values. An input set may include sensor data, such as image data, radar data, LIDAR data and the like. A classification model as described herein may, for example, classify environmental conditions, such as weather conditions and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values (illustratively, starting from or using an input set of one or more values). References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

For example, the controller of an autonomous machine may be configured to train the task performance model based on training data. The training data may include the control instructions, a result of the task performance (also referred to as actual result) and/or a predefined result (also referred to as expected result or target result). For example, the controller may be configured to determine the result of the task performance by sensing the environment of the machine. For example, the predefined result may represent an optimum result or a range of results that are acceptable. Said more generally, the training data may indicate whether the result of the task performance fulfills a predefined criterion, e.g., by comparing the actual result with the predefined result. For example, the criterion may be fulfilled when a deviation of the actual result from the predefined result is zero.

Generally, the actual result and/or the predefined result may be parameterized, e.g., represented by data (also referred to as result data) including one or more parameters as information about the result. For example, the result data may include sensed parameters, such as physical, electrical and/or chemical properties of the result.

Throughout the present disclosure, the following terms may be used as synonyms: parameter set, model parameter set, safety layer parameter set, automated motion model parameter set, and/or the like. These terms may correspond to groups of values used to implement one or more models for directing an autonomous machine to operate according to the manners described herein.

Furthermore, throughout the present disclosure, the following terms may be used as synonyms: parameter, model parameter, safety layer parameter, and/or automated movement model parameter, and/or the like, and may correspond to specific values within the previously described sets.

Various methods, processing chains, operations, computations, logical relations, models and functions are referred to herein. With respect to autonomous machines it may be understood that the references made may be analogously applied to a controller and/or code segments implementing the methods, processing chains, operations, computations, logical relations, models and functions.

As industry 4.0 develops and humans work together with autonomous machines more and more it is vital to ensure safe e working conditions. Humans may work in close proximity with autonomous machines which requires both to collaborate to accomplish different tasks. Humans collaborate with robots for tasks that they cannot or should not perform. For example, completing a task in a toxic environment. Humans may take advantage of the capabilities of autonomous machines to expedite mission completion. Autonomous machines may assist or augment human performance in an industrial, medical, or service environments among others. Autonomous machines and humans may collaborate with complementary capabilities to complete task in a shared space. Intelligent human-robot interactions may enable significant increases in efficiency many different environments.

FIG. 1 shows an example of machine 100 in accordance with various aspects of the present disclosure. In some aspects, machine 100 may include one or more processors 102; one or more one or more sensors 104; one or more effectors 114; one or more kinetic chains 116 (e.g., holding an effector); one or more propulsion devices 118; and/or one or more communication devices 120.

A sensor (also referred to as detector) may be understood as a transducer that is configured to qualitatively or quantitatively sense a property of its environment (also referred to as environmental property) corresponding to the sensor type, e.g. a geometric, kinematic, mechanical, radiometric (e.g., photometric), thermodynamically, electrical and/or chemical property. The sensed quantity is the physical quantity, to which a sensing process using the sensor is directed. Depending on the complexity of the sensor's environment to be sensed, the sensor may be configured to distinguish only between two states of the sensed quantity or to distinguish between more than two states of the sensed quantity. A sensor may be part of a sensing chain, which includes a corresponding infrastructure (e.g. processor, storage medium and/or bus system or the like). The sensing chain may be configured to operate the corresponding sensor (e.g. water sensor, pressure sensor and/or actuation sensor), to process its sensed quantity as input and to provide a result of the sensing process (also referred to as sensing result) as output, which represents the input. For example, the sensing result may be output via an electrical signal (also referred to as sensor signal). According to various aspects, the controller may be configured to implement the measuring chain at least partially.

According to various aspects, the sensing result (also referred to as sensor data) may include sensor raw data, quantized information about the sensed property (e.g., one or more values of the sensed property), or a result of processing the information about the sensed property and/or the sensor raw data. For example, the result of an image acquisition as exemplarily sensing process, may include pixel raw data, the image data based on the raw data, the result of an object recognition based on the image data, a spectral composition, a light intensity value, a distance determined based on the image data, etc. The result of the sensing process may include various types of information about an environment of the sensor, which are based on the sensing process performed by the sensor. According to various aspects, the result of the sensing process may include information about one or more logic, geometric, kinematic, mechanical, radiometric (e.g., photometric), thermodynamically, electrical and/or chemical properties of the environment of the sensor, which are determined based on the sensing process performed by the sensor. Analogously, the type of information may be a logic type, geometric type, kinematic type, mechanical type, radiometric type (e.g., photometric type), thermodynamic type, electric type and/or chemical type.

According to various aspects, the same sensing result may be obtained by sensing various environmental properties and/or by various sensors. For example, a distance of the autonomous machine from an object may be determined based on a radar sensor, a LIDAR sensor, or also by processing image data provided by a camera, e.g., stereographic image data. For example, a temperature may be determined based on a resistive temperature sensor or based on a radiometric sensor, e.g., based on a spectral composition sensed by the radiometric sensor.

Generally, each sensor 104 may be configured to sense an actual condition (also referred to as actual state), e.g., the condition at the point of time of the sensing process. Examples of the one or more sensors 104 may be configured to sense the actual condition of the machine 100 (also referred to as operational condition), wherein other examples of the one or more sensors 104 may be configured to sense the actual condition of the environment of the machine 100 (also referred to as environmental condition), e.g., to which the one or more sensors 104 are exposed. Examples of sensing the actual condition of the machine 100 may include: sensing the temperature of the machine 100, sensing the position of an effector, sensing the position of one or more nodes of the kinetic chain 116, sensing the position and/or orientation of the machine 100, sensing the speed of the machine, sensing an operation and/or status of the effector, e.g., sensing a force generated by the effector, sensing a fluid flow generated by the effector, generating an electrical power output by the effector. Examples of sensing the environmental condition of the machine 100 may include: sensing an object in the vicinity of the machine 100, e.g., one or more properties of the object; sensing a progress of the task performance; sensing radiation in the vicinity of the machine 100, e.g., electromagnetic radiation or particle radiation; sensing sound/acoustics. Examples of the object may include: the workpiece, a human, another machine; a fluid (e.g., air), a solid. Examples of the properties of the object may include: a distance of the object from the machine; a position of the object; a temperature of the object; a texture of the object; a chemical composition of the object; a movement of the object; etc.

Examples of the one or more sensors 104 include one or more optoelectronic sensors 104 (e.g., providing one or more image acquisition devices), one or more position sensors 106, one or more speed sensors, one or more distance sensors, e.g., one or more radar sensors 108 and/or one or more LIDAR sensors, one or more temperature sensors 110, one or more force sensors 112. Examples of the one or more propulsion devices 118 may include one or more ground propulsion devices 118, one or more water propulsion devices 118 and/or one or more air propulsion devices 118. Exemplary components of a propulsion device 118 may include one or more motors; one or more rollers; one or more tires; one or more continuous tracks, one or more propellers; and the like. Exemplary components of a communication device 120 may include one or more wireless transceivers 208, 210, 212; one or more antennas (also referred to as antenna system); one or more amplifiers, one or more filters, one or more modulators, one or more demodulators, one or more baseband-processors, one or more signal processors, one or more memories.

Optionally, one or more components of the autonomous machine 100 may be configured exchangeable (also referred to as exchangeable components). The autonomous machine may be configured to unmount an exchangeable component and mount a further exchangeable component in place of the unmounted component (also referred to as self-change process). For example, at least one effector of the autonomous machine 100 may be configured to as exchangeable component. In this case, the kinetic chain 116 holding the effector may be configured to release (e.g., unmount) the effector and mount another effector (also referred to as change tools).

As outlined below in more detail, the one or more processors 102 may be configured to generate one or more messages in accordance with a wireless communication protocol and provide the received one or more messages to the one or more communication devices 120. The one or more communication devices 120 may be configured to send the one or more messages in accordance with a wireless communication protocol. Analogously, the one or more communication devices 120 may be configured to send the one or more messages in accordance with a wireless communication protocol and provide the received one or more messages to the one or more processors 102. The one or more processors 102 may be configured to process the one or more messages.

In some aspects, machine 100 may include a control system 200 (as described with respect to FIG. 2 below). It is appreciated that machine 100 and control system 200 are exemplary in nature and may thus be simplified for explanatory purposes. Locations of elements and relational distances (as discussed above, the figures are not to scale) are provided as examples and are not limited thereto. The control system 200 may include various components depending on the requirements of a particular implementation.

Figure 2:
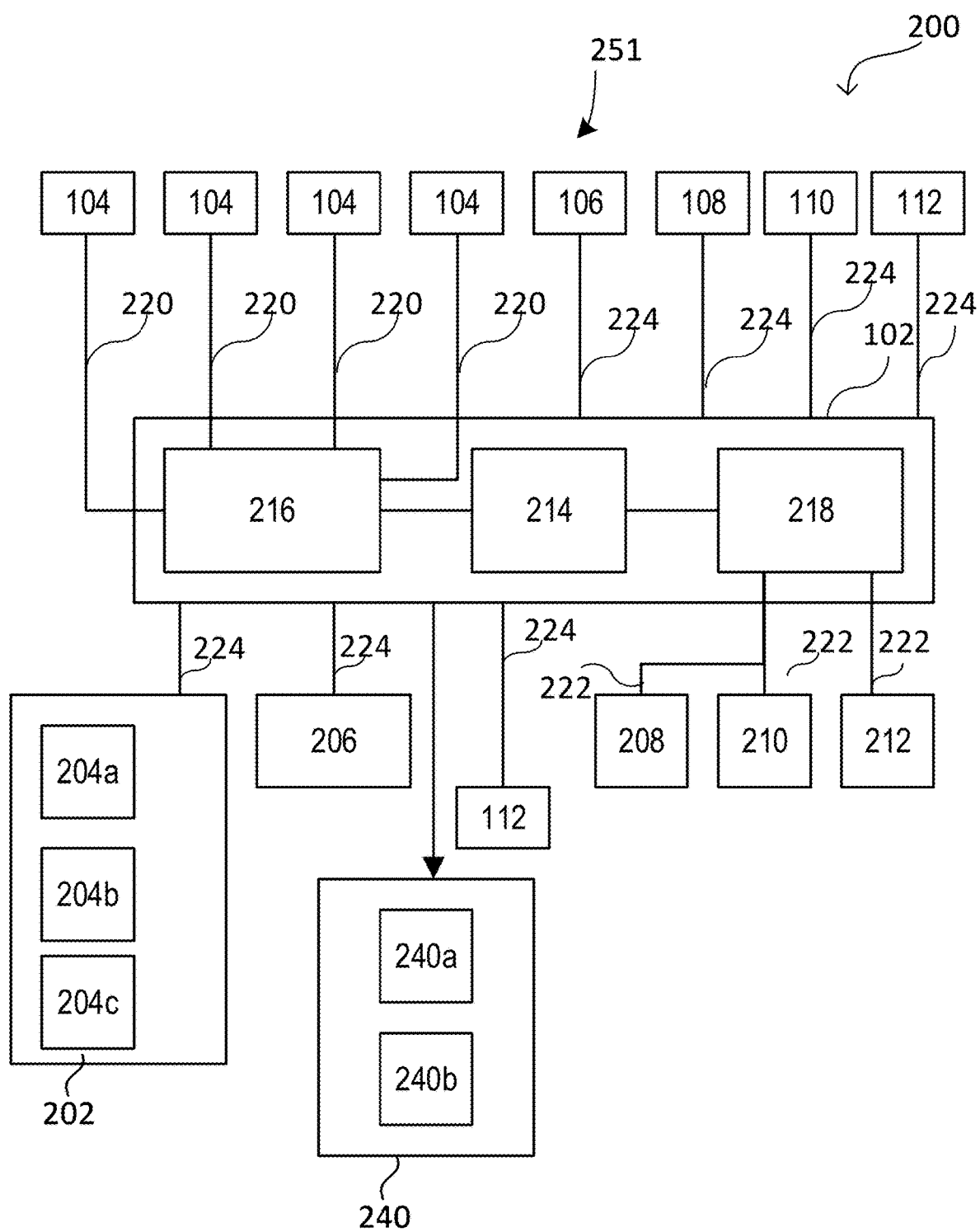
FIG. 2 shows various exemplary electronic components of an autonomous vehicle in accordance with various aspects of the present disclosure.

FIG. 2 shows various exemplary electronic components of a machine, namely control system 200, in accordance with various aspects of the present disclosure. In some aspects, the control system 200 may include one or more processors 102, one or more image acquisition devices 104 (e.g., one or more cameras), one or more position sensors 106 (e.g., a Global Navigation Satellite System (GNSS), a Global Positioning System (GPS), among others) one or more speed sensors 108, one or more radar sensors 110, and/or one or more LIDAR sensors 112. according to at least one aspect, control system 200 may further include one or more memories 202, one or more map databases 204a, one or more mission databases 204b, one or more models 204c, one or more input/output interfaces 206 (e.g., user interfaces), and/or one or more wireless transceivers 208, 210, 212. Exemplary components of the one or more input/output interfaces 206 include one or more displays, one or more touch screens, one or more microphones, one or more loudspeakers, one or more buttons and/or switches, etc.

The wireless transceivers 208, 210, 212 may, in some aspects, be configured according to the same, different, or any combination thereof radio communication protocols or standards. By way of example, a wireless transceiver (e.g., a first wireless transceiver 208) may be configured in accordance with a Short Range mobile radio communication standard (e.g., Bluetooth, Zigbee, among others). As another example, a wireless transceiver (e.g., a second wireless transceiver 210) may be configured in accordance with a Medium or Wide Range mobile radio communication standard (e.g., 3G (e.g. Universal Mobile Telecommunications System—UMTS), 4G (e.g. Long Term Evolution—LTE), and/or 5G mobile radio communication standard in accordance with corresponding 3GPP (3rd Generation Partnership Project) standards, among others). As a further example, a wireless transceiver (e.g., a third wireless transceiver 212) may be configured in accordance with a Wireless Local Area Network communication protocol or standard (e.g., IEEE 802.11, 802.11, 802.11a, 802.11b, 802.11g, 802.11n, 802.11p, 802.11-12, 802.11ac, 802.11ad, 802.11ah, among others). The one or more wireless transceivers 208, 210, 212 may be configured to transmit signals via the antenna system over an air interface.

In some aspect, the one or more processors 102 may include an application processor 214, an image processor 216, a communication processor 218, a signal processor, and/or any other suitable processing device. Image acquisition device(s) 104 may include any number of image acquisition devices and components depending on the requirements of a particular application. Image acquisition devices 104 may include one or more image capture devices, e.g., cameras, CCDs (charge coupling devices, or any other type of image sensor).

In at least one aspect, the control system 200 may also include one or more data interfaces communicatively connecting the one or more processors 102 to other components of the control system 200. For example, one or more the data interfaces may be configured to exchange data in accordance with a fieldbus communication protocol or another in-machine communication protocol. For example, the one or more data interfaces may include a first data interface, e.g., including any wired and/or wireless first link 220 or first links 220 configured to transmit image data acquired by the one or more image acquisition devices 104 to the one or more processors 102 (e.g., to the image processor 216). For example, the one or more data interfaces may include a second data interface, e.g., including any wired and/or wireless second link 222 or second links 222 configured to transmit radio transmitted data acquired by wireless transceivers 208, 210, 212 to the one or more processors 102, e.g., to the communication processor 218. For example, the one or more data interfaces may include a third data interface 224, e.g., including any wired and/or wireless third link 224 or third links 224, coupled to the position sensor 106 and/or the one or more force sensors 112.

Such data transmissions may also include communications (e.g., one-way or two-way) between the machine 100 and one or more other (target) machines in an environment of the machine 100 (e.g., to facilitate coordination of navigation of the machine 100 in view of or together with other (target) machines in the environment of the machine 100), or even a broadcast transmission to unspecified recipients in a vicinity of the transmitting machine 100.

One or more of the transceivers 208, 210, 212 may be configured to implement the group communication protocol (e.g., including a wireless data exchange protocol), and optionally one or more other communication protocols. In some aspects, the group communication protocol may include a proprietary wireless communication protocol or may be a proprietary wireless communication protocol. In some aspects, the group communication protocol may be an application layer protocol, e.g., defining the format, syntax, and/or semantics of the load part of a message generated in accordance with a wireless communication protocol.

Each processor 214, 216, 218 of the one or more processors 102 may include various types of hardware-based processing devices. Exemplary components of each processor 214, 216, 218 may include: a microprocessor, pre-processors (such as an image pre-processor), graphics processors, a central processing unit (CPU), support circuits, digital signal processors, integrated circuits, memory, or any other types of devices suitable for running applications and for sensor data processing and analysis. In some aspects, each processor 214, 216, 218 may include any type of single or multi-core processor, mobile device microcontroller, central processing unit, etc. These processor types may each include multiple processing units with local memory and instruction sets. Such processors may include video inputs for receiving image data from multiple image sensors and may also include video out capabilities.

Any of the processors 214, 216, 218 disclosed herein may be configured to perform certain functions in accordance with program instructions which may be stored in a memory of the one or more memories 202. In other words, a memory of the one or more memories 202 may store software that, when executed by a processor (e.g., by the one or more processors 102), controls the operation of the system, e.g., the control system 200. A memory of the one or more memories 202 may store one or more databases and image processing software, as well as a trained system, such as a neural network, or a deep neural network, for example. The one or more memories 202 may include any number of random access memories, read only memories, flash memories, disk drives, optical storage, tape storage, removable storage and other types of storage.

In some aspects, the control system 200 may further include components such as a speed sensor 108 (e.g., a speedometer) for measuring a speed of the machine 100. The control system may also include one or more accelerometers (either single axis or multiaxis) (not shown) for measuring accelerations of the machine 100 along one or more axes. The control system 200 may further include additional sensors or different sensor types such as an ultrasonic sensor, a thermal sensor, one or more radar sensors 110, one or more LIDAR sensors 112 (which may be integrated in the head lamps of the machine 100), and the like. The third data interface may couple the speed sensor 108, the one or more radar sensors 110 and the one or more LIDAR sensors 112 to at least one of the one or more processors 102.

The one or more memories 202 may store data, e.g., in a database or in any different format. The one or more processors 102 may be configured to process sensory information (also referred to as sensor data), such as images, radar signals, depth information from LIDAR, temperature values or stereo processing of two or more images) of the environment of the machine 100 together with position information, such as a GPS coordinate, a machine's ego-motion, etc., to determine a current location of the machine 100 relative to the known landmarks, and refine the determination of the machine's location. Certain aspects of this technology may be included in a localization technology such as a mapping and routing model.

The map database 204 may include any type of database storing (digital) map data for the machine 100, e.g., for the control system 200. The map database 204 may include data relating to the position, in a reference coordinate system, of various items, including roads, buildings, walls, topographic features (e.g., stairs), geographic features, rooms, points of interest, spatial information of a task, docks, etc. In some aspects, a processor of the one or more processors 102 may download (e.g., some or all) information of the map database 204 over a wired or wireless data connection to a communication network (e.g., over a cellular network and/or the Internet, etc.). In some aspects, a processor of the one or more processors 102 may be configured to determine, e.g., form and/or update, (e.g., some or all) information of the map database 204, e.g., based on sensing the environmental condition by the one or more sensors 104. In some aspects, the map database 204 may store a sparse data model including polynomial representations of the environment of the machine 100.

In some aspects, the control system 200 may include a mission database. Exemplary components of the mission database may include mission data, a task list, a task status, a task allocation, achievement parameters, target results, etc.

Furthermore, the control system 200 may include a task performance model 204b, e.g., implemented by an automated system. By way of example, the control system 200 may include (e.g., as part of the task performance model) a computer implementation of a formal model of the machine or its environment. By way of example, the control system 200 may include (e.g., as part of the task performance model) a safety performance model, a task interpretation model and/or a machine control model. A task performance model may be or include a mathematical model formalizing an interpretation of applicable task performance policies, safety policies, operation policies, mission data, etc., e.g., being applicable to autonomous machines. It is noted that one or more of the detailed components of the task performance model may be implemented monolithically of the separately from each other, e.g., by separate applications executed by the one or more processors.

For example, the safety performance model may be configured to achieve, e.g., three goals: first, the interpretation of safety policies should be sound in the sense that it complies with how humans interpret the safety policies; second, the interpretation should lead to a useful task performance, meaning it will lead to an agile task performance rather than an overly-defensive task performance which inevitably would confuse other agents (e.g., humans and/or machines) and will obstruct accomplishing the mission and in turn limit the scalability of system deployment; and third, the interpretation should be efficiently verifiable in the sense that it can be rigorously proven that the autonomous machine correctly implements the interpretation of the safety policies. The safety performance model, illustratively, may be or include a mathematical model for safety assurance that enables identification and performance of proper responses to dangerous situations such that caused by the ego-machine's own actions.

For example, the task interpretation model may be configured to determine a formal formulation of performance steps to be taken by the machine, e.g., based on information about one or more tasks of the mission allocated to the machine and/or based on the target performance. The conversion may be configured to lead to an efficient task performance and to a result, which meets the target performance as best as possible, e.g., to accomplish the task.

For example, the machine control model may be configured to determine useful actions taken by the machine leading to a useful task performance, e.g., based on the performance steps and/or the model of the machine and/or its environment. For example, the machine control model may generate the control instructions based on a model of the kinetic chain of the machine, the available effectors of the machine, the reachable position of the machine, etc.

In some aspects, the control system 200 may include a driving device 240 configured to drive one or more actuators of the autonomous machine, e.g., one or more actuators of the kinematic chain of the autonomous machine 100 and/or one or more actuators of the one or more propulsion devices 118. For example, the driving device 240 may include one or more amplifiers 240a and/or one or more energy storages 240b. Examples of energy storages 240b may include any storage capable to storing energy (in a certain form, e.g., such as electrically, magnetically, chemically, and the like) and convert the stored energy in electrical power. Examples of the amplifiers 240a may include any voltage-to-voltage converter providing an operation voltage of the one or more actuators based on the electrical power and based on a control signal received from the one or more processors 102.

As described above, the machine 100 may include the control system 200 as also described with reference to FIG. 2.

The machine 100 may include the one or more processors 102 e.g. integrated with or separate from an engine control unit (ECU) of the machine 100.

The control system 200 may in general generate data to control or assist to control the ECU and/or other components of the machine 100 to directly or indirectly control the driving of the machine 100.

Although the following aspects will be described in association with the above detailed models, any other model may be provided in alternative implementations.

Figure 3:
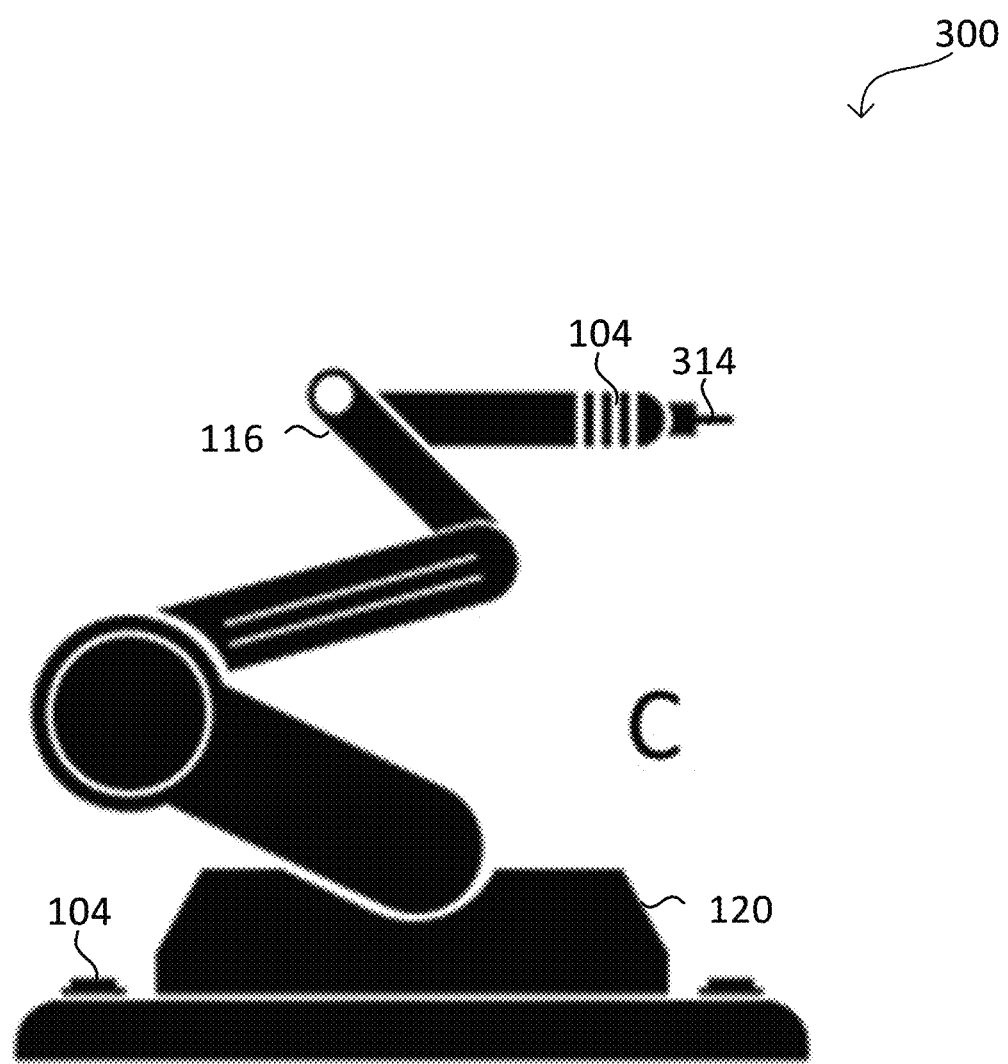
FIG. 3 shows an exemplary autonomous machine in accordance with various aspects of the present disclosure.
Figure 4:
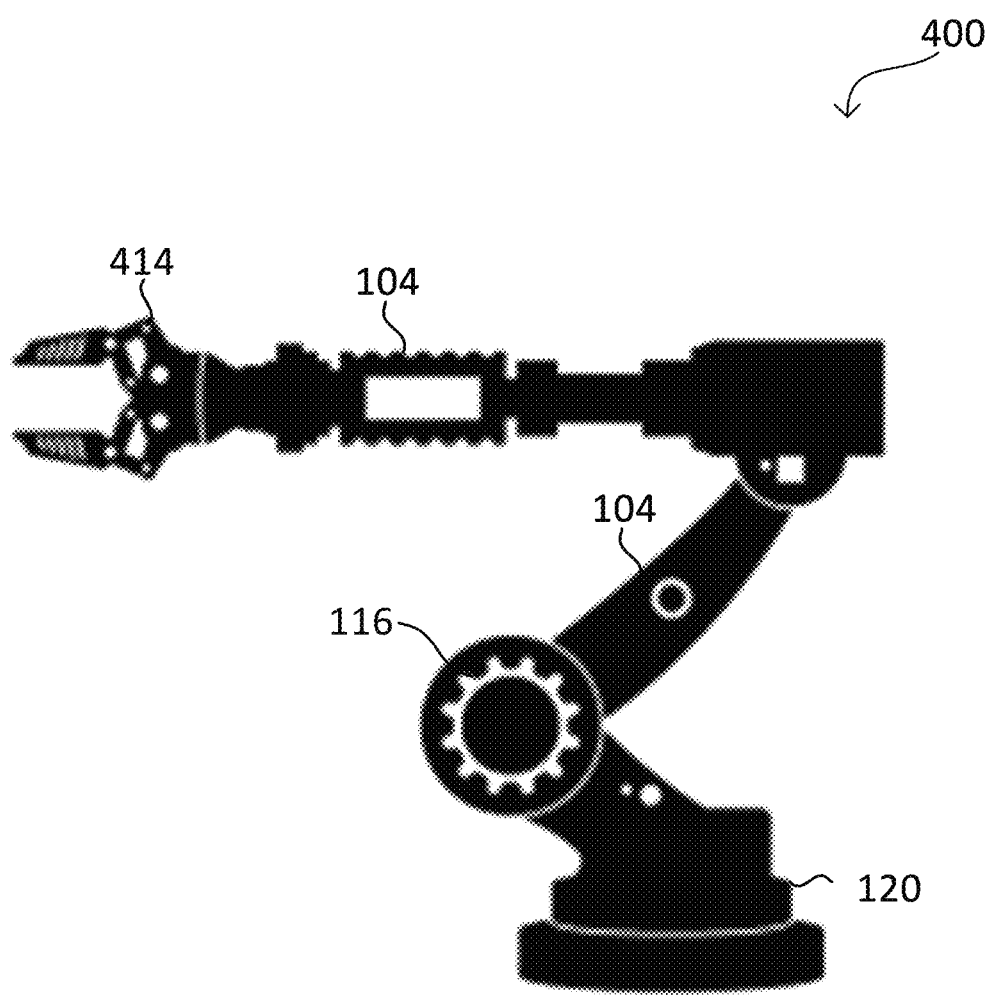
FIG. 4 shows an exemplary autonomous machine in accordance with various aspects of the present disclosure.

FIGS. 3 and 4 show further examples of autonomous machines. FIG. 3 shows a further example of an autonomous machine 300 in accordance with various aspects of the present disclosure. Autonomous machine 300 may be similar to autonomous machine 100 of FIG. 1 and includes similar components. For example, one or more processors 102 (not shown); one or more one or more sensors 104; one or more effectors 114; one or more kinetic chains 116 (e.g., holding an effector); and/or one or more communication devices 120. Machine 300 may be stationary and include a welding device 314 similar to effector 114 of FIG. 1.

FIG. 4 shows a further example of an autonomous machine 400 in accordance with various aspects of the present disclosure. Autonomous machine 400 may be similar to autonomous machine 100 of FIG. 1 and includes similar components. For example, one or more processors 102 (not shown); one or more one or more sensors 104; one or more effectors 114; one or more kinetic chains 116 (e.g., holding an effector); and/or one or more communication devices 120. Machine 400 may be stationary and include a grabber device 414 similar to effector 114 of FIG. 1.

Figure 5:
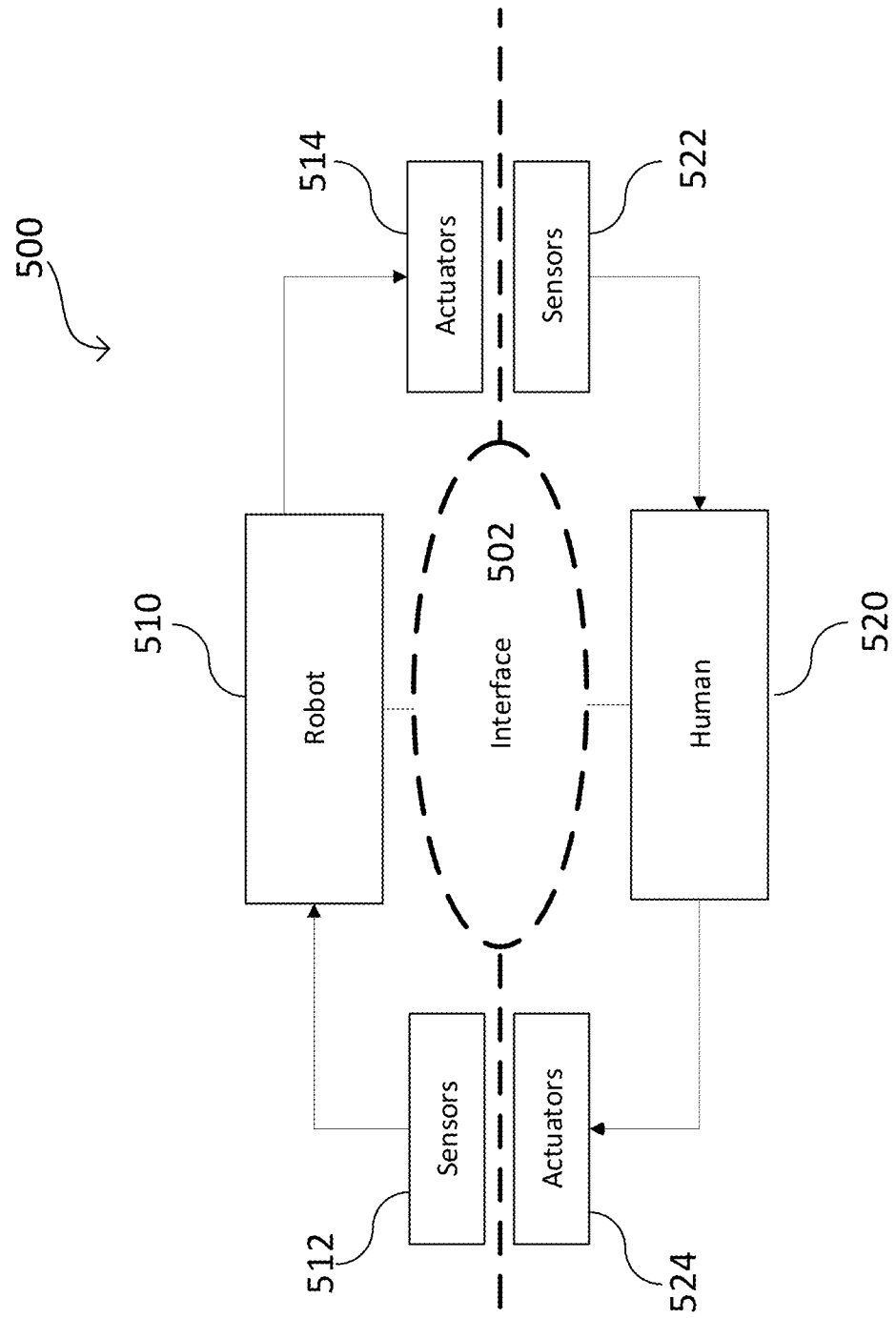
FIG. 5 shows an exemplary interface between human and autonomous machine task agents in accordance with various aspects of the present disclosure.

FIG. 5 shows a communication interface between human and autonomous machine task agents assigned to the same mission. A collaborative environment 500 of autonomous machine and human task agents may include communication interface 502, one or more autonomous machines 510 and one or more humans 520. Communication interface 502 may be configured to send messages between human and autonomous machine task agents according to a wireless communication protocol. Environment 500 may include one or more autonomous machines 510 which include one or more sensors 512 and one or more actuators 514. The autonomous machine 510 may rely on sensor measurements of sensors 512 to control actuators 514. The autonomous machine 510 may communication sensor measurements and control instructions via wireless communication interface 502. Environment 500 may include one or more human task agents equipped with one or more sensors 522 and one or more actuators 524. The human 520 may read measurements of sensors 522 and decide how to control actuators 524. The human may communication sensor measurements and control instructions via wireless. Alternatively, the sensors 512 and 522 and actuators 514 and 524 may communication sensor measurements and control instructions directly via wireless may communication interface.

As humans interact more and more with autonomous machines, it is important to have clearly defined rolls for each. The clear roll definition may require unambiguous bidirectional information between human and autonomous machine task agents in a collaborative environment. Collaborative environments may require a communication interface between humans and autonomous machines. The communication interface may include an internet protocol.

The communication interfaces and protocols may configure to consider human limitations when communicating different tasks between agents in a collaborative environment. Machine learning techniques may be used to train data of an autonomous machine. Conversely, machine learning techniques may be used to alert human task agents to information the autonomous machine has "learned."

As an example, where humans and automated machines are collaboratively exploring an area with a chemical which is undetectable to humans, an automated machine equipped with the right sensor may alert a human task agent to the potentially harmful chemical or substance.

Alternatively, a combination of available sensors and/or possible analytics, may enable machines/robots to predict the operating errors and alert human task agents to the error. The human task agents may be able to identify the cause of the error.

Data collected over time may be used in conjunction with machine learning techniques may infer or predict information which human task agents can't process, especially over a period of time.

Automated machines may use historical human task agent actions to review if actions have resulted in undesired/erroneous operation of machines. Machines may sense these through their own sensors and use analytics which may not be visible to human eyes to provide data back to humans for them to learn change/update the actions in a shared space.

Sensor measurements may be used to determine a control instruction for actuators. The sensor measurements and actions based on the control instructions may be communicated to determine collaboration between human and autonomous machine task agents.

Figure 6:
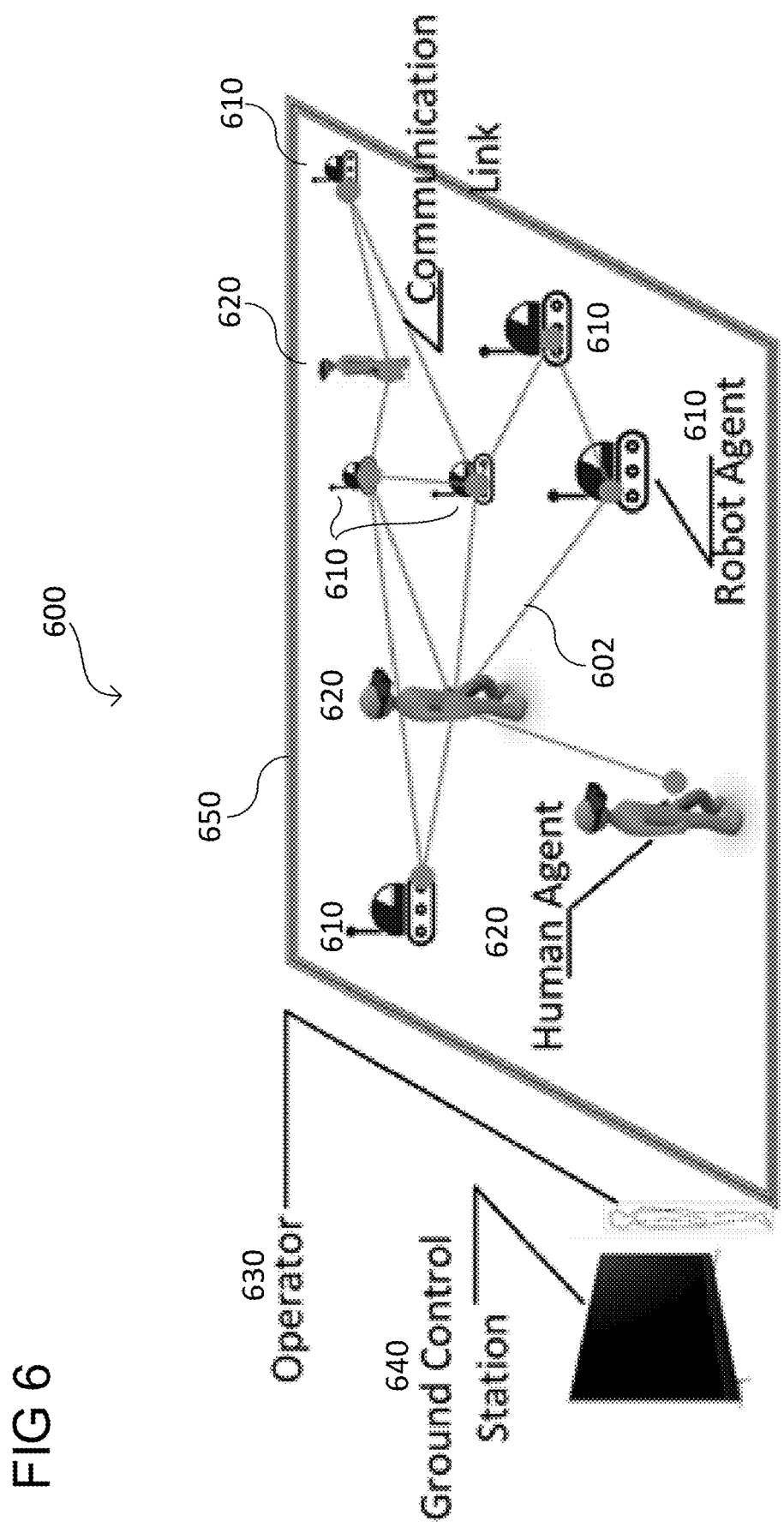
FIG. 6 shows an exemplary system of communication between autonomous machine and human task agents in accordance with various aspects of the present disclosure.

FIG. 6 shows an exemplary system of communication 600 between autonomous machines 610 and human 620 task agents in collaboration environment 650 connected to each other via communication link 602. Each autonomous machine 610 or human 620 may communication to any other autonomous machine 610 or human 620 via communication link 602. Information communicated between autonomous machine 610 or human 620 may also be communicated to ground control station 640. Information may be aggregated at the ground control station 640 and displayed. Operator 630 may be a human able to read the information of ground control station 640 and review sensor measurements and actions of autonomous machine 610 and/or human 620. If intervention is required, human operator 630 do so based on the information of ground control station 640.

Autonomous machines 610 may be similar to autonomous machines 510 described with respect to FIG. 5. Humans 620 may be similar to humans 520 described with respect to FIG. 5.

Figure 7:
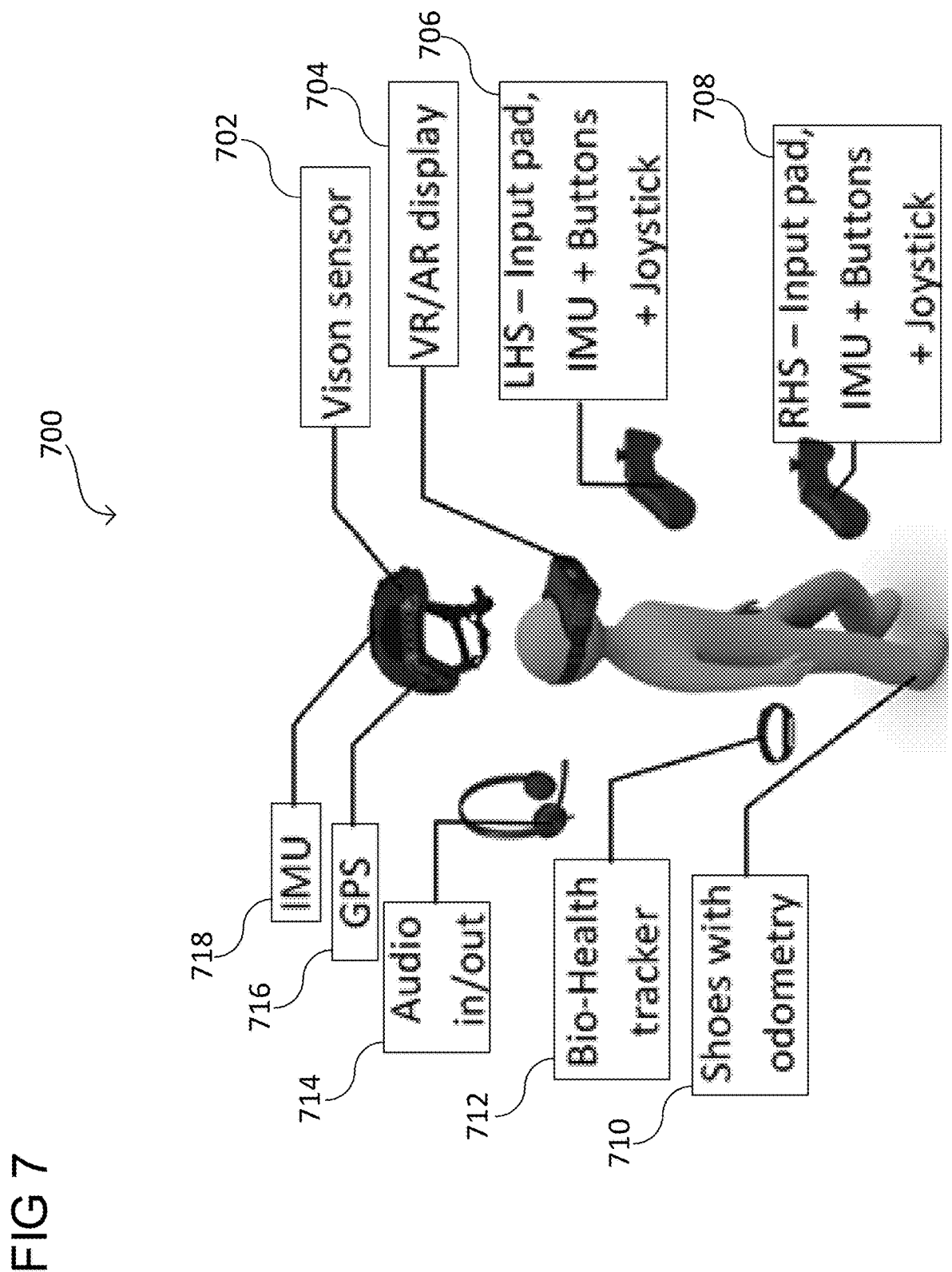
FIG. 7 shows an exemplary human task agent equipped with sensor devices in accordance with various aspects of the present disclosure.

FIG. 7 shows an exemplary human task agent 700 equipped with sensor devices 702 to 718 for collaboration with autonomous machines. Human 700 may be similar to human task agents 520 described with respect to FIG. 5 and human task agents 620 described with respect to FIG. 6. Human 700 may be equipped with a plurality of sensors to accomplish tasks and communicate information to other task agents within a collaborative environment. Some of the devices equipped on human 700 may include vision sensor 702, virtual reality/actual reality display 704, left hand input pad 706, right hand input pad 708, odometry shoes 710, vitals tracker 712, audio input/output 714, GPS tacker 716, and inertial measurement unit 718.

Sensor measurements of any of the sensors or devices 702 to 718 may be communicated to any other task agents associated with a mission.

Figure 8:
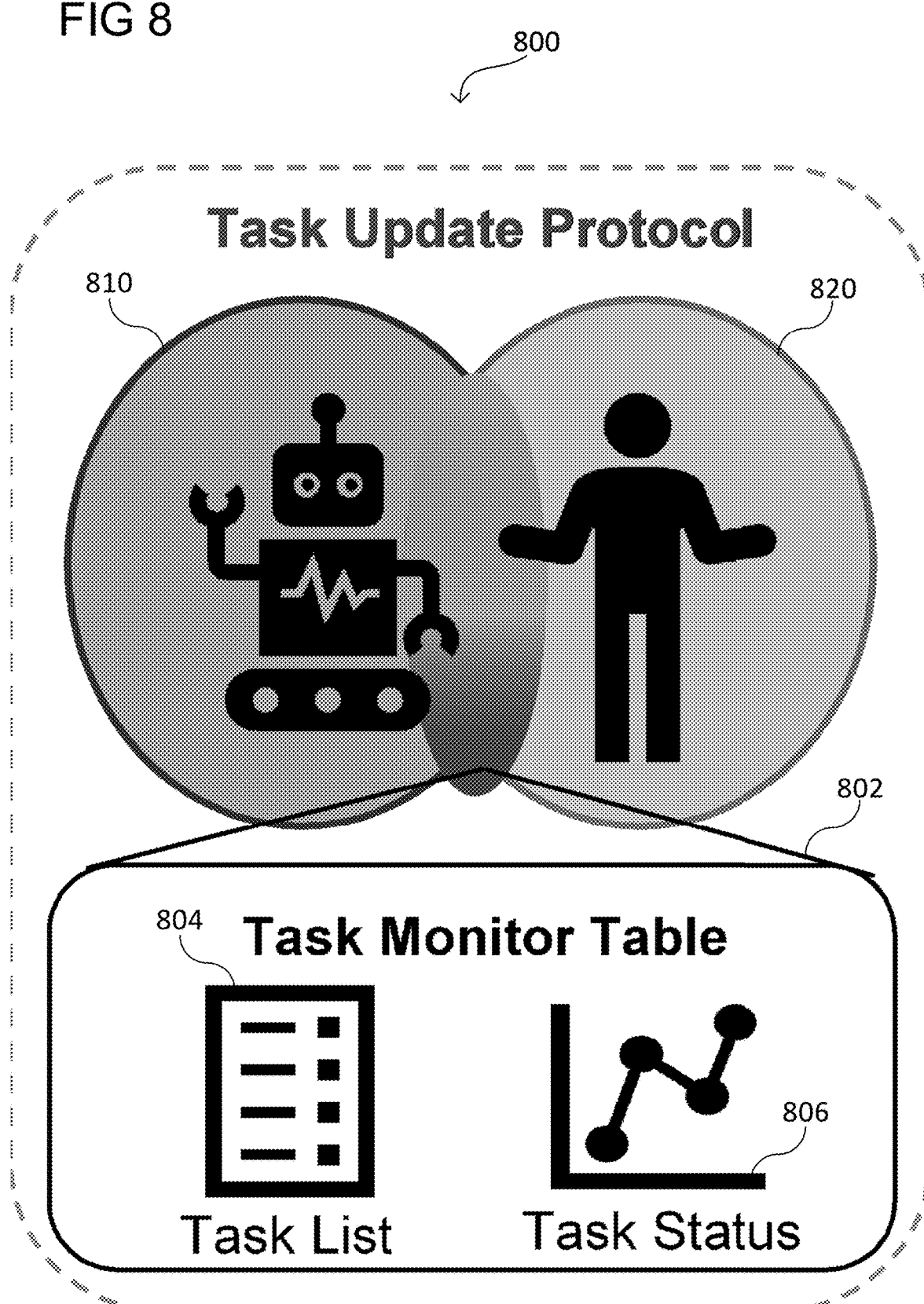
FIG. 8 shows an exemplary task manager in accordance with various aspects of the present disclosure.

FIG. 8 shows task management protocol 800. Task management protocol 800 may be associated with one or more missions. Each mission may include one or more tasks. The one or more task may be included in task list 804 in accordance with various aspects of the present disclosure. Each task of a mission may include a task status 806. For example, a task may be completed, not started, started, or any other status. Task manager 802 may review the task list and assign them to task agents. Human task agent 820 and autonomous task agent 810 may communicate with task manager 802. Communication between task manager 802 and Human task agent 820 and autonomous task agent 810 may include task status, task agent capabilities, sensor measurements, or any other information that may be required to assign a task.

The task manager may assign a task based in part on the capabilities of the task agent. Other information may be considered when assigning a task, such as a confidence score or trust score described in further detail below. A task assignment scheme for human-robot collaboration to accomplish tasks of a mission may be implemented in a collaborative environment. The task assignment scheme may include configurations to dynamically update and incorporate real-time task status and task agent capabilities. The task monitor table may provide details on tasks and their completion status. Robot and humans task agents may include their corresponding task with latest status. This information is used to provide real-time feedback to the overall mission status through the task update protocol. The protocol may be extended to exchange task between different task agents. Task agents may broadcast their capabilities via task update protocol so that a task manager may assign tasks, or task agents may review tasks in the task list and take a task for which it is capable.

Figure 9:
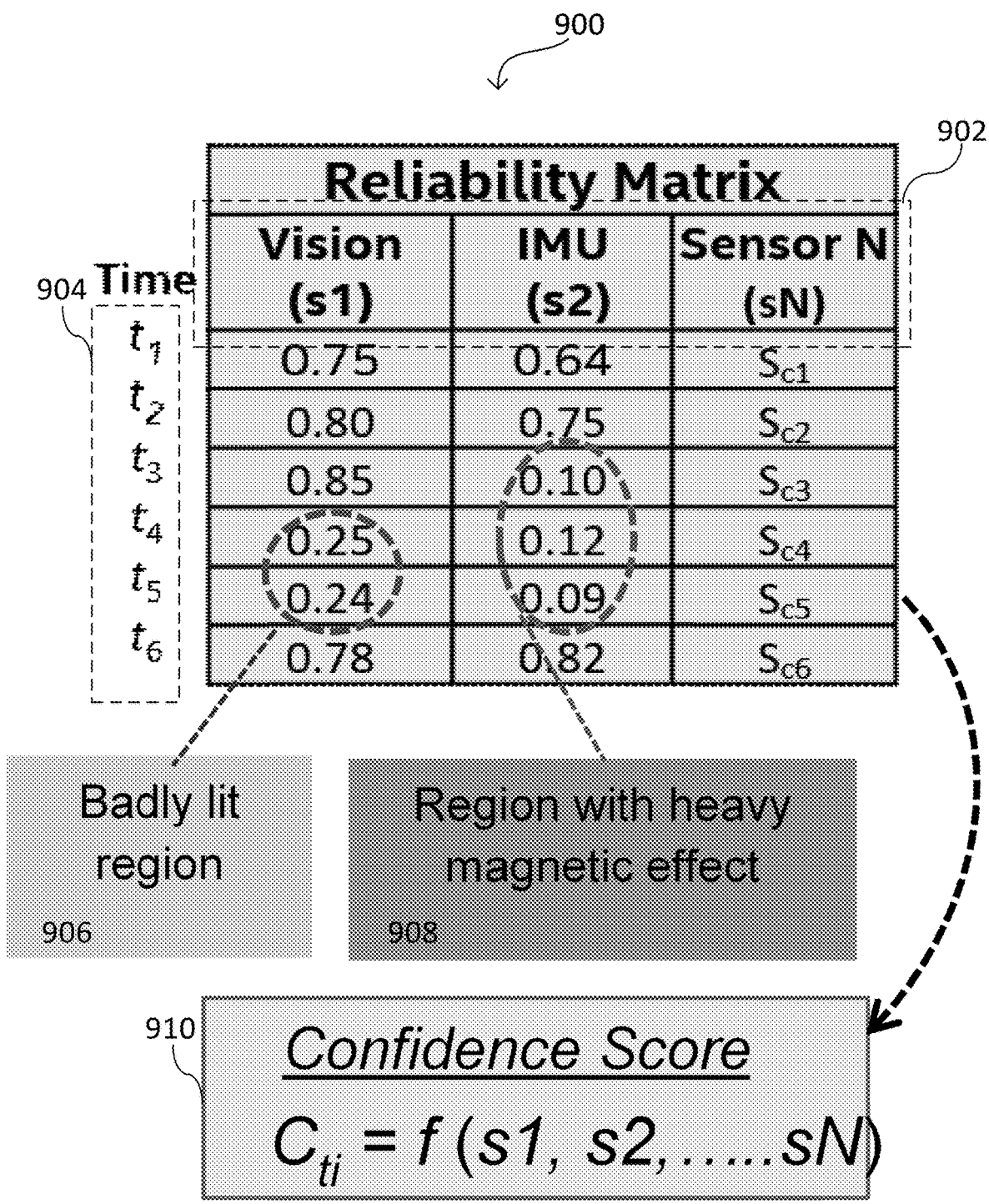
FIG. 9 shows an exemplary reliability matrix in accordance with various aspects of the present disclosure.

FIG. 9 shows a reliability matrix 900 of sensor measurements and environment details used to determine a confidence score of a task agent. Each task agent may include a reliability matrix 900 which includes sensor measurements for its sensors 902 over times 904. Environment information may be determined from the sensor measurements. For example, vision sensor measurements at times t4 and t5 may indicate a badly lit environment 906. As another example, IMU sensor measurements at times t3, t4, and t5 may indicate an environment with heavy magnetic activity 908. Sensor measurements included in reliability matrix 900 may be input into a formula to calculate a confidence score 910. The formula for calculating the confidence score may include a comparison with sensor measurement data of other task agents.

For example, if a first task agent reports vision sensor measurements at times t4 and t5 indicating a poorly lit region, but further task agents report vision sensor measurements for the same region at the same times indicating a well-lit region, a failure of the vision sensor of the first task agent may have occurred. This may reduce the confidence score of the first task agent. The confidence score may later be used to assign tasks and a low confidence score may preclude a task agent from taking a task.

The reliability matrix may use individual task agent sensor measurement data and capabilities to generate a validation module. The sensor measurement data and task agent capabilities may be input to multi-modal human-robot interface. This data may also be processed to determine non-obvious operating conditions, such as high magnetic effect/influence. These inputs can be aggregated to the human-robot interface for free communication to allow appropriate safe/reliable human robot interaction. This allows full autonomous operation of the autonomous machines. For example, without human intervention or interaction. The updated sensor measurement data captured as time-series information may be used for identifying sensor data anomalies and initiating any safety protocols.

Confidence score computation may rely on the sensor measurement data stored in the sensor reliability matrix. The sensor measurement data in conjunction with the determined operating conditions can be used for computing the confidence score. An optimization problem or a game theory approach may be used to formulate a problem with the objective of computing the confidence score. This may be updated regularly to take into account the dynamic changes.

An average function may be used to determine the confidence score. Alternatively, analytics may include a second moment function calculated as an average of the squares of the sensor measurements, variance, and standard deviation. This data may be extracted from each task agent to compute its confidence score.

Confidence score may also be calculated using machine learning techniques. The sensor scores can be provided as parameters to a neural network machine learning algorithm. The parameters may be used to assign weights to the sensors (based on the earlier obtained results) to assign priority to specific sensors while computing confidence score.

Each autonomous machine may include a kinematic safety model based on capabilities of the autonomous machine and sensor measurement data. The kinematic safety model may be a physics based model that incorporates reasonable and foreseeable human behavior for the specific environment. For example, if autonomous machine perceives a human within its vicinity it may change its behavior. The trajectory of the autonomous machine may be changed to ensure it does not collide with the predicted trajectory of the perceived human. It may use a probabilistic machine learning algorithm to predict and plan robot and human trajectories. For example, the reasonably foreseeable rate of change of orientation angle for a human operating near robots may be used to determine a safe action of the autonomous machine.

It is crucial for the interactions between humans and autonomous machines be provably safe to prevent harm or injury to humans operating with in the vicinity of autonomous machines. Such a safety approach must be flexible to support the full range of different deployment use cases. The concept can be extended to a cyber-physical social system where cyber-system, physical-system (AMRs, humanoids etc.) and social-system (humans) can work together to enable interesting use-cases.

Figure 10:
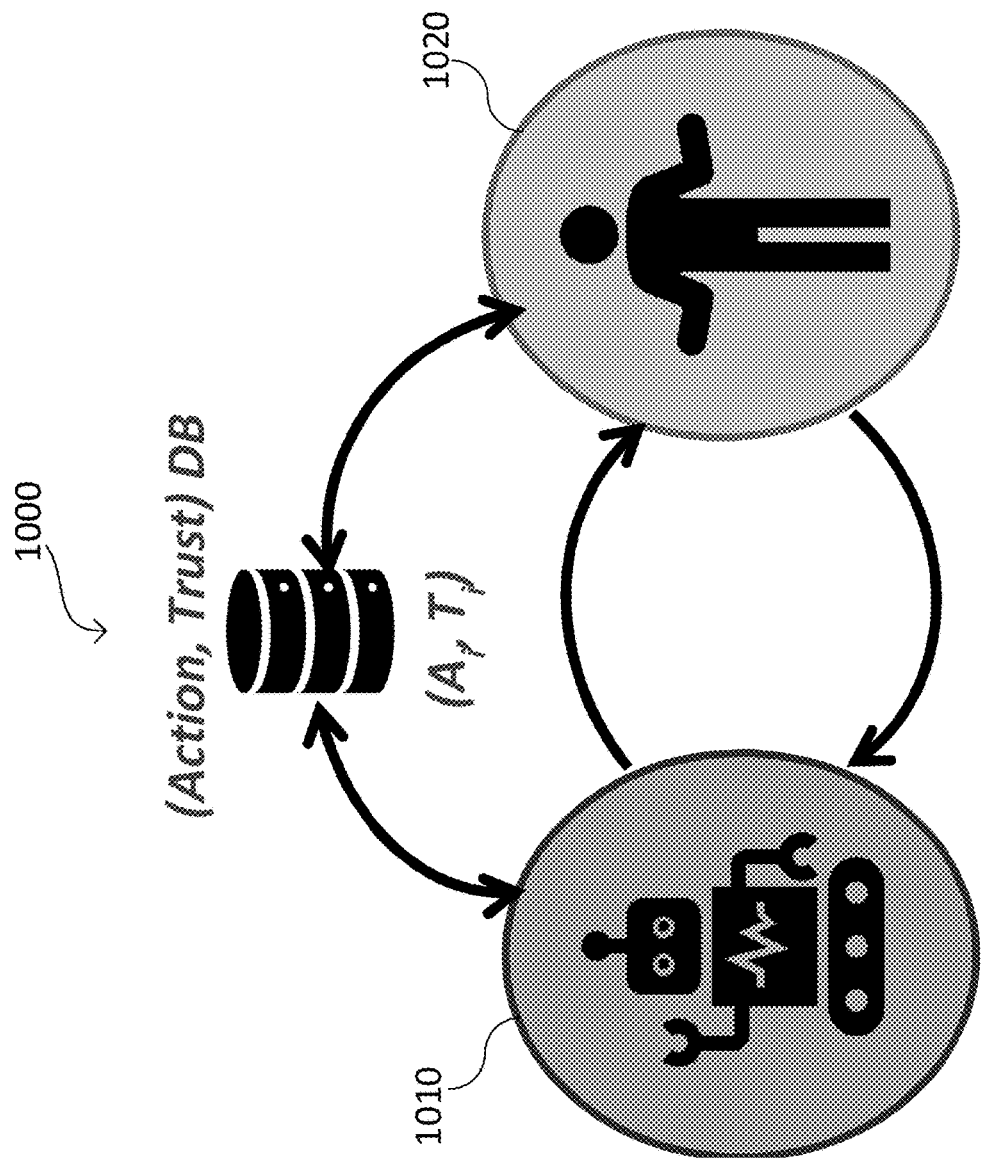
FIG. 10 shows an exemplary trust score database in accordance with various aspects of the present disclosure.

FIG. 10 shows an exemplary trust score database 1000 of trust score of autonomous machine 1010 and human task agent 1020. Each task agent may include a trust score based on a comparison between its observed action and expected actions. Expected actions may be determined in part based on the environment conditions. A trust threshold may be determined for different scenarios. If a task agent's trust score does not satisfy the trust threshold it be precluded from participating in a task.

Two different parameters can be used to measure trust. TrustR may be a score human task agents use to trust an autonomous machine. TrustH may be a score autonomous machine task agents use to trust a human. The trust score may be based on the observed action and assigned to a task agent. Trust can be measured using true score theory:

$$TX = T + eTx$$

where TX is an observed trust, T is a true trust, and eTx is the error score.

The error score may be a combination of random and systematic error in the action taken. Trust scores for robots and humans based on the actions can be computed. For detailed analysis and 'learning', this can be stored in Action Trust Database (ATDB) as shown in FIG. 10. Humans and robots update ATDB for each significant action (ith action) that is taken (robots and humans). The scale/resolution of this can be fine or coarse based on the need. Ultimately, the information from ATDB can be used to come up with TrustR and TrustH scores and used to weigh the actions of robots and humans.

Figure 11:
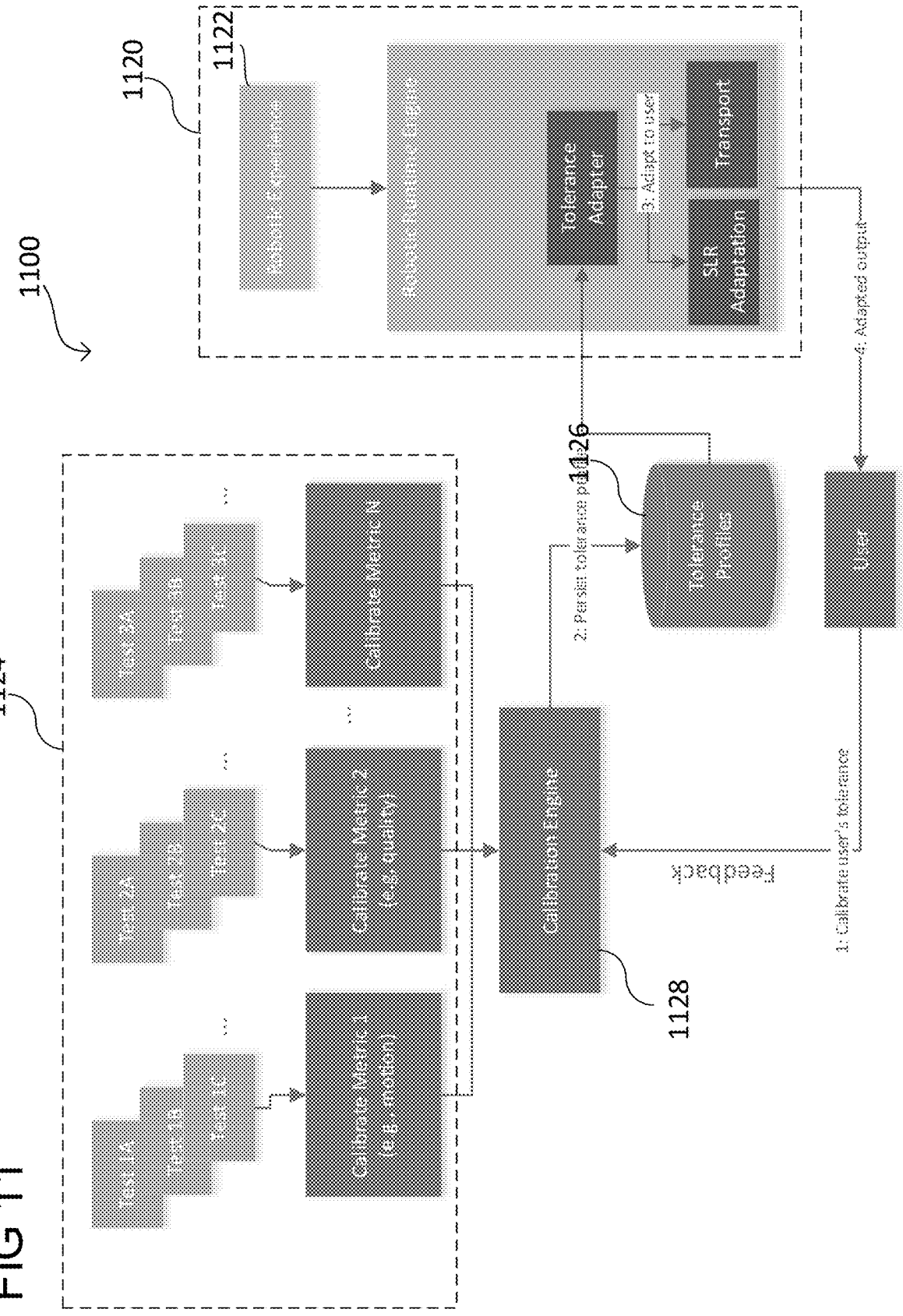
FIG. 11 shows an exemplary flow chart for generating a tolerance score in accordance with various aspects of the present disclosure.

FIG. 11 shows an exemplary flow chart 1100 to determine a tolerance profile for a task agent. For example, an autonomous machine 1120. To generate a tolerance score calibration engine 1128 calibrates the observed actions 1122 of robot 1120 using several metrics 1124. Individual task agent tolerance profiles may be stored in tolerance profile database 1126. Tasks may be assigned based on the task agent tolerance profile. For example, a task agent may be equipped with sensors that allow it to tolerate poorly lit conditions. If the task is determined to be for a poorly lit environment, the task is assigned to an agent with a high tolerance for those conditions.

Collaborative personalized tolerance profiles may include a runtime subsystem which loads a task agent's tolerance profile and notes the metrics that negatively affect it the most and the metric they are able to tolerate the most. The task agent may also provide explicit rating to a UI such as ground control 640 display after the taken action about the results. A Heuristic model may construct by continuously profiling task agent movement for a specific task along with sensor measurements to determine the tolerance profile.

While determining the tolerance profile for a task agent, the contents and adjustments from previous steps may be made available. A service level agreement (SLA) adaption may use the contents and adjustments to express a certain quality of service. In this way the SLA may adapt the system to meet the Service Level "metric" affecting the user. This may affect other metrics that the user is less sensitive to.

Figure 12:
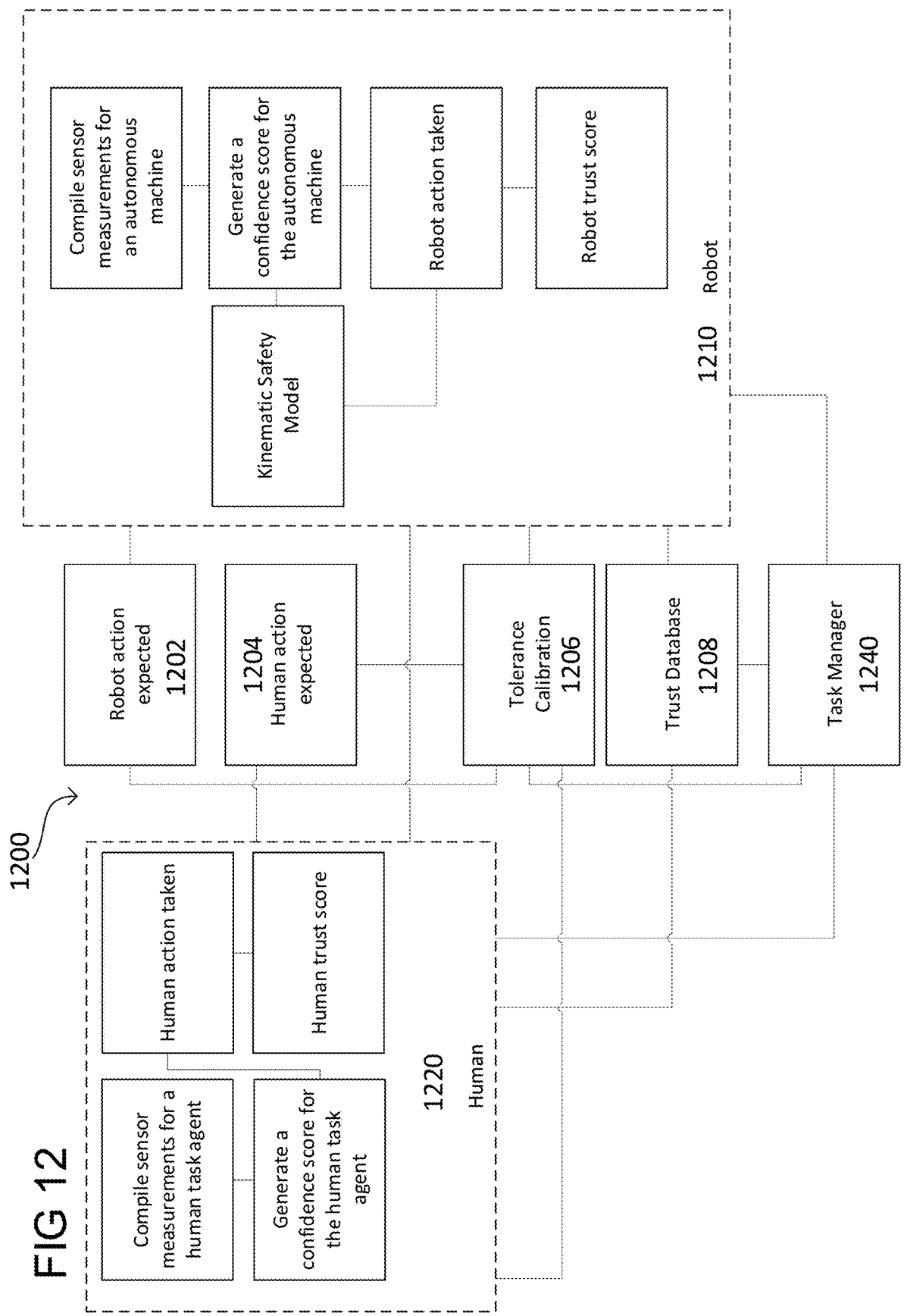
FIG. 12 shows an exemplary system of communication for assigning tasks in accordance with various aspects of the present disclosure.

FIG. 12 shows an exemplary system of communication 1200 for assigning tasks in accordance with various aspects of the present disclosure. The task manager 1240, similar to the task manager 802, may take in several inputs as previously described in order to allocate tasks to task agents. Alternatively, it may be the task agent that selects the task. Robot task agent 1210 and human task agent 1220 may each be equipped with one or more sensors to sense its environment or perform tasks. I may compile sensor measurements over time and store the information locally and broadcast the information to other task agents. The sensor measurement data may be used to determine a reliability/confidence score and/or trust score as previously described.

The robot task agent 1210 may also include a safety model used to safely interact with human task agents as previously described.

Robot task agent 1210 may compare its historical actions with expected actions 1204. The expected actions may be based on the task and/or environment conditions. This comparison may be used to determine its trust score and communicated/stored to/in trust database 1208.

Similarly, human task agent 1220 may compare its historical actions with expected actions 1202. The expected actions may be based on the task and/or environment conditions. This comparison may be used to determine its trust score and communicated/stored to/in trust database 1208.

Both task agents 1210 and 1220 may communicate sensor measurements to tolerance calibration engine 1206. The tolerance calibration engine may determine what conditions the task agent may endure. For example, if they are still able to capture images in dark environments, or perform actions at high temperatures.

All collected data may be input into task manager 1240 to allocate tasks. Task manager 1240 may optimize task assignments to determine the safest allocation or the most accurate. As task agent's confidence, trust, and tolerance scores change, tasks may be reassigned. For example, if a task agent performance declines, it may be removed from the group for maintenance.

Each task agent may take sensor measurements to build a reliability matrix and generate a confidence score as described with respect to FIG. 9.

The reliability matrix may allow for a reliable and safe multi-modal interface for human-robot interface/information exchange in a factory setting is enabled with below inventions:

A feedback mechanism on the performance of the system of task agents can take the form of lagging measures to track the reliability of the trust scores. For example, if despite a high trust score a safety incident were to happen between the robot and the human, then that is a lagging measure that can be used to adjust the reliability matrix or enhance the size of the kinematic based safety envelope for that particular use case.

As human task agents tend to occupy a commanding agent roll, there is mostly one-way task delegation. If there are changes needed or robot has to notify the human of a different action from human collaboration between task agents is crucial.

As the protocols between human and machine are pre-defined, they cannot adapt to changes in situations/scenarios, changes in environment, unexpected behaviors, task progress/priority.

In a group of autonomous agents working collaboratively, humans can interact safely (i) as experts for some tasks and (ii) as part of the working group itself—where they can collaborate and share spaces with robots. To enable this, a robust deployment scheme and safe intelligent collaboration schemes are devised.

As humans and robots operate in shared space—it is key to enable a rich and robust multi-modal interface solution for robots to safely interact with humans; also, it is critical to handle adverse scenarios such as, sensor failures and inaccuracies, any unexpected behavior of robot and humans.

Each autonomous machine task agent may generate a sensor reliability matrix with corresponding sensor measurement data and operating condition. The confidence score, is based on the reliability matrix. An autonomous machine may include a safety model that checks the sensor measurement data to ensure that the interactions are provably safe with respect to humans.

Personalized tolerance profiles that are dynamically adjusted based on the machine learning algorithms for collaborative interaction among themselves and when they interact individually or as a team with one or more users.

Inclusion of trust threshold trust R threshold for human to trust the robot operation/intention and a trust H threshold for robots to trust the human operation/intention. Trust scores for individual robots/humans can be exchanged with other robots and humans/groups for better decision-making (based on tasks/actions).

With the proposed methods (e.g., sensor reliability matrix), robots and humans can 'adapt' to the environment/s and situation/s in a factory/industrial setting in a provably safe manner. The devised techniques help in mutual communication and adaptation between humans and robots in natural and smart ways. Trust thresholds and transparency scores help agents (humans/robots) to assess the current situations in a meaningful way (taking best action possible) and optimize the overall operation. This can also be used to intelligently partition the work between humans and robots. Adverse situations such as, sensor failures and inaccuracies are handled gracefully, and safety aspects are enhanced (kinematic-based safety model). The concepts here can help scale the solution to be applicable to cyber physical social systems which can further help enable multiple new use-cases.

Figure 13:
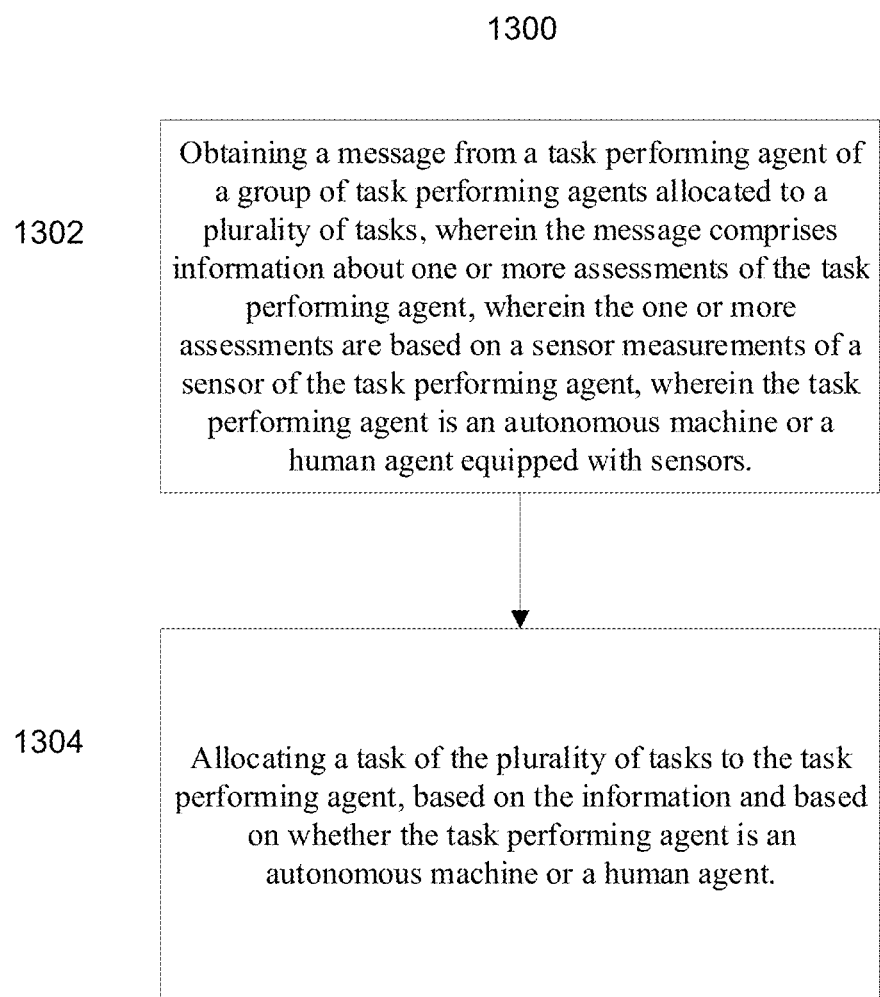
FIG. 13 shows an exemplary flow chart for task agent collaboration in accordance with various aspects of the present disclosure.

FIG. 13 shows an exemplary method of performing a task allocation according to some aspects. FIG. 13 shows exemplary method 1300. As shown in FIG. 13, method 1300 obtaining a message from a task performing agent of a group of task performing agents allocated to a plurality of tasks, wherein the message comprises information about one or more assessments of the task performing agent, wherein the one or more assessments are based on a sensor measurements of a sensor of the task performing agent, wherein the task performing agent is an autonomous machine or a human agent equipped with sensors (stage 1302); and allocating a task of the plurality of tasks to the task performing agent, based on the information and based on whether the task performing agent is an autonomous machine or a human agent. (stage 1304).

Human-robot interaction and collaboration with a shared space between human and robot enables humans to interact with a group/team of robots safely. As experts for some tasks and as part of the working group itself—where they can collaborate and share spaces with robots. To enable this, a robust deployment scheme and safe intelligent collaboration schemes to be disclosed.

In the following, various aspects of the present disclosure will be illustrated:

In Example 1, a controller including a processor configured to obtain a message from a task performing agent of a group of task performing agents allocated to a plurality of tasks, wherein the message comprises information about an assessment of the task performing agent, wherein the assessment is based on a sensor measurement of the task performing agent, wherein the task performing agent is an automated machine or a human agent; and allocate a task of the plurality of tasks to the task performing agent, based on the information about the assessment and based on whether the task performing agent is an automated machine or a human agent.

In Example 2, the subject matter of Example 1, may optionally further include wherein the assessment comprises a sensor reliability score based in part on a comparison of results of a sensor measurement with an expected sensor measurement.

In Example 3, the subject matter of any one of Examples 1 or 2, may optionally further include wherein the processor is further configured to obtain a sensor measurement of a further task agent.

In Example 4, the subject matter of any one of Examples 1 to 3, may optionally further include wherein the sensor reliability score is based in part on a comparison of the sensor measurement and the sensor measurement of the further task agent.

In Example 5, the subject matter of any one of Examples 1 to 4, may optionally further include a reliability threshold.

In Example 6, the subject matter of any one of Examples 1 to 5, may optionally further include wherein the processor is further configured to compare the reliability score to the reliability threshold.

In Example 7, the subject matter of any one of Examples 1 to 6, may optionally further include wherein the processor is further configured to determine that the sensor failed based on the comparison of the reliability score to the reliability threshold.

In Example 8, the subject matter of any one of Examples 1 to 7, may optionally further include wherein the sensor measurement is a measurement of an environment condition.

In Example 9, the subject matter of any one of Examples 1 to 8, may optionally further include wherein the processor is further configured to broadcast the reliability score.

In Example 10, the subject matter of any one of Examples 1 to 9, may optionally further include wherein the assessment comprises an accuracy score based on a comparison of observed actions by the task performing agent with expected actions.

In Example 11, the subject matter of any one of Examples 1 to 10, may optionally further include wherein the accuracy score is further based on the sensor measurement.

In Example 12, the subject matter of any one of Examples 1 to 11, may optionally further include wherein the sensor measurement is the environment condition.

In Example 13, the subject matter of any one of Examples 1 to 12, may optionally further include wherein the processor is further configured to store the accuracy score of the further task agent.

In Example 14, the subject matter of any one of Examples 1 to 13, may optionally further include wherein the processor is further configured to broadcast the accuracy score of the task agent.

In Example 15, the subject matter of any one of Examples 1 to 14, may optionally further include wherein the assessment comprises a tolerance score based on the environment condition and a comparison of the sensor measurement with an expected sensor measurement.

In Example 16, the subject matter of any one of Examples 1 to 15, may optionally further include wherein the processor is further configured to determine a task performing agent capability.

In Example 17, the subject matter of any one of Examples 1 to 16, may optionally further include wherein the tolerance score is further based on the task performing agent capability.

In Example 18, the subject matter of any one of Examples 1 to 17, may optionally further include wherein the processor is further configured to obtain the tolerance score of the further task performing agent.

In Example 19, the subject matter of any one of Examples 1 to 18, may optionally further include wherein the processor is further configured to broadcast the tolerance score of the task performing agent.

In Example 20, the subject matter of any one of Examples 1 to 19, may optionally further include wherein the processor is further configured to store the tolerance score for the group of task performing agents.

In Example 21, the subject matter of any one of Examples 1 to 20, may optionally further include wherein each of the task performing agents comprises a unique ID.

In Example 22, the subject matter of any one of Examples 1 to 21, may optionally further include wherein the task allocation is further based on the sensor reliability score, the accuracy score, or the tolerance score.

In Example 23, the subject matter of any one of Examples 1 to 22, may optionally further include wherein the task allocation comprises an allocation score based on the reliability score, the accuracy score, and the tolerance score.

In Example 24, the subject matter of any one of Examples 1 to 23, may optionally further include wherein the processor is further configured to optimize the allocation score.

In Example 25, the subject matter of any one of Examples 1 to 24, may optionally further include wherein the processor is further configured to determine that one of the reliability score, the accuracy score, or the tolerance score falls below a respective threshold.

In Example 26, the subject matter of any one of Examples 1 to 25, may optionally further include wherein the processor is further configured to determine a new task allocation based on the determination of the failure to satisfy a threshold.

In Example 27, the subject matter of any one of Examples 1 to 26, may optionally further include wherein the processor is further configured to monitor the reliability score, the accuracy score, or the tolerance score with a respective threshold.

In Example 28, the subject matter of any one of Examples 1 to 27, may optionally further include wherein the processor is further configured to determine a task progress.

In Example 29, the subject matter of any one of Examples 1 to 28, may optionally further include wherein the task allocation is based on the task progress.

In Example 30, a controller including a memory configured to store instructions, a processor coupled to the memory to execute the instructions, wherein the instructions are configured to obtain a message from a task performing agent of a group of task performing agents allocated to a plurality of tasks, wherein the message comprises information about an assessment of the task performing agent, wherein the assessment is based on a sensor measurement of the task performing agent, wherein the task performing agent is an automated machine or a human agent; and allocate a task of the plurality of tasks to the task performing agent, based on the information about the assessment and based on whether the task performing agent is an automated machine or a human agent.

In Example 31, the subject matter of Example 30 may optionally further include any one of the devices of Examples 2 to 29.

In Example 32 a controller including a processor configured to obtain assessment information of an automated machine of a group of task performing agents allocated to a plurality of tasks, wherein the assessment information is based on results of a sensor measurement of the automated machine; obtain an expected trajectory of a human agent of the group of task performing agents, wherein the human agent is equipped with the sensor; and determine whether an action of the automated machine is safe according to a safety model of the automated machine based on the assessment information and the expected trajectory, wherein the safety model comprises a probabilistic or formal model.

In Example 33, the subject matter of Example 32, may optionally further include wherein assessment information comprises a trust assessment based on a comparison of observed actions of the automated machine and expected actions of the automated machine.

In Example 34, the subject matter of any one of Examples 32 or 33, may optionally further include wherein the task is determined to be safe and the automated machine executes the task.

In Example 35, the subject matter of any one of Examples 32 to 34, may optionally further include wherein the processor is further comprising a memory, wherein the results of the sensor measurement stored in the memory.

In Example 36, the subject matter of any one of Examples 32 to 35, may optionally further include wherein the safety model further comprises the stored results of the sensor measurement.

In Example 37, the subject matter of any one of Examples 32 or 36, may optionally further include wherein the task is determined to be unsafe and the processor is further configured to generate control signal configured to adjust the projected trajectory of the task performing agent based on the safety determination.

In Example 38, a controller including a memory configured to store instructions, a processor coupled to the memory to execute the instructions, wherein the instructions are configured to obtain assessment information of an automated machine of a group of task performing agents allocated to a plurality of tasks, wherein the assessment information is based on results of a sensor measurement of the automated machine; obtain an expected trajectory of a human agent of the group of task performing agents, wherein the human agent is equipped with the sensor; and determine whether an action of the automated machine is safe according to a safety model of the automated machine based on the assessment information and the expected trajectory, wherein the safety model comprises a probabilistic or formal model.

In Example 39, the subject matter of Example 38 may optionally further include any one of the devices of Examples 33 to 37.

In Example 40, a method including obtaining a message from a task performing agent of a group of task performing agents allocated to a plurality of tasks, wherein the message comprises information about an assessment of the task performing agent, wherein the assessment is based on a sensor measurement of the task performing agent, wherein the task performing agent is an automated machine or a human agent; and allocating a task of the plurality of tasks to the task performing agent, based on the information about the assessment and based on whether the task performing agent is an automated machine or a human agent.

In Example 41, the subject matter of Example 40, may optionally further include wherein the assessment comprises a sensor reliability score based in part on a comparison of results of a sensor measurement with an expected sensor measurement.

In Example 42, the subject matter of any one of Examples 40 or 41, may optionally further include wherein the processor is further configured to obtain a sensor measurement of a further task agent.

In Example 43, the subject matter of any one of Examples 40 to 42, may optionally further include wherein the sensor reliability score is based in part on a comparison of the sensor measurement and the sensor measurement of the further task agent.

In Example 44, the subject matter of any one of Examples 40 to 43, may optionally further include a reliability threshold.

In Example 45, the subject matter of any one of Examples 40 to 44, may optionally further include comparing the reliability score to the reliability threshold.

In Example 46, the subject matter of any one of Examples 40 to 45, may optionally further include determining that the sensor failed based on the comparison of the reliability score to the reliability threshold.

In Example 47, the subject matter of any one of Examples 40 to 46, may optionally further include wherein the sensor measurement is a measurement of an environment condition.

In Example 48, the subject matter of any one of Examples 40 to 47, may optionally further include broadcasting the reliability score.

In Example 49, the subject matter of any one of Examples 40 to 48, may optionally further include wherein the assessment comprises an accuracy score based on a comparison of observed actions by the task performing agent with expected actions.

In Example 50, the subject matter of any one of Examples 40 to 49, may optionally further include wherein the accuracy score is further based on the sensor measurement.

In Example 51, the subject matter of any one of Examples 40 to 50, may optionally further include wherein the sensor measurement is the environment condition.

In Example 52, the subject matter of any one of Examples 40 to 51, may optionally further include storing the accuracy score of the further task agent.

In Example 53, the subject matter of any one of Examples 40 to 52, may optionally further include broadcasting the accuracy score of the task agent.

In Example 54, the subject matter of any one of Examples 40 to 53, may optionally further include wherein the assessment comprises a tolerance score based on the environment condition and a comparison of the sensor measurement with an expected sensor measurement.

In Example 55, the subject matter of any one of Examples 40 to 54, may optionally further include determining a task performing agent capability.

In Example 56, the subject matter of any one of Examples 40 to 55, may optionally further include wherein the tolerance score is further based on the task performing agent capability.

In Example 57, the subject matter of any one of Examples 40 to 56, may optionally further include obtaining the tolerance score of the further task performing agent.

In Example 58, the subject matter of any one of Examples 40 to 57, may optionally further include broadcasting the tolerance score of the task performing agent.

In Example 59, the subject matter of any one of Examples 40 to 58, may optionally further include storing the tolerance score for the group of task performing agents.

In Example 60, the subject matter of any one of Examples 40 to 59, may optionally further include wherein each of the task performing agents comprises a unique ID.

In Example 61, the subject matter of any one of Examples 40 to 60, may optionally further include wherein the task allocation is further based on the sensor reliability score, the accuracy score, or the tolerance score.

In Example 62, the subject matter of any one of Examples 40 to 61, may optionally further include wherein the task allocation comprises an allocation score based on the reliability score, the accuracy score, and the tolerance score.

In Example 63, the subject matter of any one of Examples 40 to 62, may optionally further include optimizing the allocation score.

In Example 64, the subject matter of any one of Examples 40 to 63, may optionally further include determining that one of the reliability score, the accuracy score, or the tolerance score falls below a respective threshold.

In Example 65, the subject matter of any one of Examples 40 to 64, may optionally further include determining a new task allocation based on the determination of the failure to satisfy a threshold.

In Example 66, the subject matter of any one of Examples 40 to 65, may optionally further include monitoring the reliability score, the accuracy score, or the tolerance score with a respective threshold.

In Example 67, the subject matter of any one of Examples 40 to 66, may optionally further include wherein determining a task progress.

In Example 68, the subject matter of any one of Examples 40 to 67, may optionally further include wherein the task allocation is based on the task progress.

In Example 69 a method including obtaining assessment information of an automated machine of a group of task performing agents allocated to a plurality of tasks, wherein the assessment information is based on results of a sensor measurement of the automated machine; obtaining an expected trajectory of a human agent of the group of task performing agents, wherein the human agent is equipped with the sensor; and determining whether an action of the automated machine is safe according to a safety model of the automated machine based on the assessment information and the expected trajectory, wherein the safety model comprises a probabilistic or formal model.

In Example 70, the subject matter of Example 69, may optionally further include wherein assessment information comprises a trust assessment based on a comparison of observed actions of the automated machine and expected actions of the automated machine.

In Example 71, the subject matter of any one of Examples 69 or 70, may optionally further include wherein the task is determined to be safe and the automated machine executes the task.

In Example 72, the subject matter of any one of Examples 69 to 71, may optionally further include storing the results of the sensor measurement.

In Example 73, the subject matter of any one of Examples 69 to 72, may optionally further include wherein the safety model further comprises the stored results of the sensor measurement.

In Example 74, the subject matter of any one of Examples 69 or 73, may optionally further include wherein the task is determined to be unsafe and the processor is further configured to generate control signal configured to adjust the projected trajectory of the task performing agent based on the safety determination.

In Example, 75, a controller including one or more processors configured to obtain a message from a task performing agent of a group of task performing agents allocated to a plurality of tasks, wherein the message comprises information about one or more assessments of the task performing agent, wherein the one or more assessments are based on a sensing process performed by one or more sensors of the task performing agent, wherein the task performing agent is an autonomous machine or a human agent equipped with sensors; and allocate a task of the plurality of tasks to the task performing agent, based on the information and based on whether the task performing agent is an autonomous machine or a human agent.

In Example 76, a controller including a processor configured to obtain a tolerance profile of a task performing agent of a group of task performing agents allocated to a task, wherein the tolerance profile comprises an observed action associated with an environment condition; compare the observed action with an expected action; and determine whether the environment condition affects the observed action based on the comparison.

In Example 77, the subject matter of Example 76, may optionally further include wherein the observed action is a sensor measurement.

In Example 78, the subject matter of Example 76 or 77, may optionally further include to assign a task to the task performing agent based on the tolerance profile and the environment condition.

In Example 79, a controller including one or more processors configured to obtain a tolerance profile of a task performing agent of a group of task performing agents allocated to a task, wherein the tolerance profile comprises an observed action associated with an environment condition; compare the observed action with an expected action; and determine whether the environment condition affects the observed action based on the comparison.

In Example 80, the subject matter of Example 79, may optionally further include wherein the observed action is a sensor measurement.

In Example 81, the subject matter of any one of Examples 79 or 80, may optionally further include where the one or more processors are further configured to assign a task to the task performing agent based on the tolerance profile and the environment condition.

In Example 82, a method including obtaining a tolerance profile of a task performing agent of a group of task performing agents allocated to a task, wherein the tolerance profile comprises an observed action associated with an environment condition; comparing the observed action with an expected action; and determining whether the environment condition affects the observed action based on the comparison.

In Example 83, the subject matter of Example 82, may optionally further include wherein the observed action is a sensor measurement.

In Example 84, the subject matter of any one of Examples 82 or 83, may optionally further include assigning a task to the task performing agent based on the tolerance profile and the environment condition.

In Example 85, a system including one or more devices according to Examples 1 to 39 and 75 to 81 configured to implement a method according to Examples 40 to 74 and 82 to 84.

In Example 86, one or more non-transitory computer readable media comprising programmable instructions thereon, that when executed by one or more processors of a device, cause the device to perform any one of the method of Examples 40 to 74 and 82 to 84.

In Example 87, a means for implementing any one of the Examples 1 to 39 and 75 to 81.

While the above descriptions and connected figures may depict electronic device components as separate elements, skilled persons will appreciate the various possibilities to combine or integrate discrete elements into a single element. Such may include combining two or more circuits to form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature and are thus understood as capable of being implemented in a corresponding device. Likewise, it is appreciated that implementations of devices detailed herein are understood as capable of being implemented with a corresponding method. It is thus understood that a device corresponding to a method detailed herein may include one or more components configured to perform each aspect of the related method.

All acronyms defined in the above description additionally hold in all claims included herein.

What is claimed is:

1. A controller comprising:
   a processor configured to:
      obtain a message from a task performing agent of a group of task performing agents allocated to a mission comprising a plurality of tasks, wherein the message comprises information about one or more assessments of the task performing agent, wherein the task performing agent is an autonomous machine, wherein the group of task performing agents comprise the autonomous machine and a human agent equipped with sensors, wherein the one or more assessments are based on a sensor measurement of a sensor of the autonomous machine and comprise a sensor reliability score of the sensor measurement based on a comparison of the sensor measurement with expected sensor measurements;

allocate a new task of the plurality of tasks of the mission to the task performing agent, based on the information about the one or more assessments of the task performing agent; and control movements of the autonomous machine according to the allocated task by providing task performance instructions to the task performing agent.

2. The controller of claim 1, wherein the one or more assessments comprises an accuracy score based on a comparison of actions observed by the task performing agent with actions expected by the task performing agent and of the results of sensor measurement with the expected sensor measurements.

3. The controller of claim 2, wherein the one or more assessments comprises a tolerance score based on environmental conditions and based on the sensor measurement compared with expected sensor measurements.

4. The controller of claim 3, wherein the processor configured to allocate the new task comprises the processor configured to allocate the new task further based on the accuracy score or the tolerance score.

5. A non-transitory computer readable medium, having stored thereon, instructions that when executed by a computing device, cause the computing device to perform operations comprising:

obtaining a message from a task performing agent of a group of task performing agents allocated to a mission comprising a plurality of tasks, wherein the message comprises information about one or more assessments of the task performing agent, wherein the one or more assessments are based on a sensor measurement of a sensor of the task performing agent, wherein the task performing agent is an autonomous machine, wherein the group of task performing agents comprise the autonomous machine and a human agent equipped with sensors, wherein the one or more assessments comprise a sensor reliability score based on a comparison of a result of a sensing process with expected sensor measurements;

allocating a new task of the plurality of tasks of the mission to the task performing agent, based on the information about the one or more assessments of the task performing agent; and control movements of the autonomous machine according to the allocated task by providing task performance instructions to the task performing agent.

6. The non-transitory computer readable medium of claim 5, wherein the one or more assessments comprises an accuracy score based on a comparison of observed actions by the task performing agent with expected actions and results of a sensing process with expected sensor measurements.

7. The non-transitory computer readable medium of claim 6, wherein the one or more assessments comprises a tolerance score based on results of a sensing process with expected sensor measurements and environment conditions.

8. The non-transitory computer readable medium of claim 7, wherein the allocating the new task comprises allocating the new task further based on the accuracy score or the tolerance score.

* * * * *